(12) United States Patent
Kumar et al.

(10) Patent No.: US 12,549,122 B2
(45) Date of Patent: Feb. 10, 2026

(54) MOTOR CONTROLLER WITH ADAPTIVE REFERENCE LOAD ANGLE FOR IMPROVING POWER EFFICIENCY

(71) Applicant: TEXAS INSTRUMENTS INCORPORATED, Dallas, TX (US)

(72) Inventors: Shivam Kumar, Bangalore (IN); Venkata Naresh Kotikelapudi, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 30 days.

(21) Appl. No.: 18/193,679

(22) Filed: Mar. 31, 2023

(65) Prior Publication Data

US 2024/0333186 A1  Oct. 3, 2024

(51) Int. Cl.
*H02P 8/38* (2006.01)
*H02P 8/36* (2006.01)
*H02P 23/14* (2006.01)

(52) U.S. Cl.
CPC .................................. *H02P 23/14* (2013.01)

(58) Field of Classification Search
CPC ............ H02M 1/0085; H02M 1/0025; H02M 1/4225; H02M 3/1584; H02M 1/4233; H02P 21/18; H02P 6/06; H02P 6/20; H02P 6/34; H02P 2201/15; H02P 2101/45; H02P 9/00; H02P 9/009; H02P 9/04; H02P 9/14; H02P 9/302; H02P 9/48; H02P 23/30; H02P 6/21; H02P 21/141; H02P 2207/05; H02P 23/26; H02P 21/22; H02P 21/26; H02P 2205/07; H02P 23/14; H02P 27/085; H02P 8/12; H02P 21/0089; H02P 21/06
See application file for complete search history.

(56) References Cited

U.S. PATENT DOCUMENTS

| | | | |
|---|---|---|---|
| 2011/0031912 A1* | 2/2011 | Hong ...................... | H02P 21/26 318/400.04 |
| 2012/0153886 A1* | 6/2012 | Dwersteg .................. | H02P 8/16 318/696 |
| 2019/0190424 A1* | 6/2019 | Reddy ..................... | H02P 21/22 |
| 2020/0274469 A1* | 8/2020 | Tsuchihashi .............. | H02P 8/10 |
| 2024/0266977 A1* | 8/2024 | Dwersteg .................. | H02P 8/32 |

* cited by examiner

*Primary Examiner* — Kawing Chan
*Assistant Examiner* — Charles S Laughlin
(74) *Attorney, Agent, or Firm* — Xianghui Huang; Frank D. Cimino

(57) ABSTRACT

A motor controller including load angle error determination circuitry for determining a load angle error based on a difference between a motor load angle and a reference load angle. The motor load angle indicates an angle between a stator magnetic field and a rotor magnetic field of a motor. The motor controller includes current control circuitry for setting a current level for the motor based on the load angle error. The motor controller includes reference load angle control circuitry for setting the reference load angle based on the current level.

18 Claims, 19 Drawing Sheets

MOTOR CONTROLLER WITH ADAPTIVE REFERENCE LOAD ANGLE FOR IMPROVING POWER EFFICIENCY

BACKGROUND

Electric motors include a rotor and a stator having a plurality of windings. Some electric motors include brushed direct current motors, brushless direct current (BLDC) motors, and stepper motors. In some electric motors, the rotor is or includes a permanent magnet. These permanent magnet motors operate by sequentially energizing the windings to attract or repel the permanent magnet rotor into rotational motion.

SUMMARY

In one example, a motor controller includes load angle error determination circuitry for determining a load angle error based on a difference between a motor load angle and a reference load angle. The motor load angle indicates an angle between a stator magnetic field and a rotor magnetic field of a motor. The motor controller includes current control circuitry for setting a current level for the motor based on the load angle error. The motor controller includes reference load angle control circuitry for setting the reference load angle based on the current level.

In one example, a method for controlling a motor includes setting a current level to a first level when a load torque of the motor is equal to a first torque. The method includes setting a reference load angle to a first angle when the load torque is equal to the first torque, the first angle being based on the first level. The method includes adjusting the current level from the first level to a second level, different than the first level, in response to a change in the load torque from the first torque to a second torque, different than the first torque. The method includes adjusting the reference load angle from the first angle to a second angle, different than the first angle, in response to adjusting the current level from the first level to the second level, the second angle being based on the second level.

In one example, a non-transitory computer-readable medium storing computer-executable instructions is disclosed. The instructions, when executed, cause a processor to perform operations. The operations include setting a current level to a first level when a load torque of a motor is equal to a first torque. The operations include setting a reference load angle to a first angle when the load torque is equal to the first torque, the first angle being based on the first level. The operations include adjusting the current level from the first level to a second level, different than the first level, in response to a change in the load torque from the first torque to a second torque, different than the first torque. The operations include adjusting the reference load angle from a first angle to a second angle, different than the first angle, the second angle being based on the second level.

BRIEF DESCRIPTION OF THE DRAWINGS

The drawings are not necessarily to scale. Generally, the same reference numbers (or other reference designators) in the drawing(s) and this description refer to the same or similar (functionally and/or structurally) features.

DETAILED DESCRIPTION

Some motor controllers control a motor based on a motor load angle (e.g., an angle between a stator magnetic field and a rotor magnetic field of the motor). For example, some motor controllers control a current level of the motor based on a difference between the motor load angle and a reference load angle indicating a target load angle for the motor. The motor controller adjusts the current level of the motor to reduce the difference between the motor load angle and the reference load angle (e.g., to drive the motor load angle closer to the reference load angle). If the motor load angle becomes too large, the motor may stall. In theory, the maximum load angle at which the motor can reliably operate is 90 degrees. Setting the reference load angle to some value less than the maximum sustainable load angle establishes a margin of safety. For example, setting the reference load angle to 80 degrees would theoretically set a 10 degree margin of safety.

In some motor controllers, the reference load angle is set to a fixed angle to establish a fixed margin of safety across all motor currents. However, the motor may be more vulnerable to stalling during torque transients when the motor current is lower. Thus, choosing a higher fixed reference load angle may result in a diminished margin of safety at lower motor currents, thereby increasing the likelihood of stalling at lower motor currents. Further, the motor may be less vulnerable to stalling during torque transients when the motor current is higher. Thus, choosing a lower reference load angle may result in an excessive margin of safety at higher motor currents, thereby reducing power efficiency at higher motor currents.

Various examples of the present description are related to a motor controller that controls a motor using an adaptive reference load angle to improve a power efficiency of the motor. The motor controller includes load angle error determination circuitry that determines a load angle error based on a difference between the motor load angle and the reference load angle. The motor controller further includes current control circuitry that controls a current level of the motor based on the load angle error. The motor controller further includes reference load angle control circuitry that controls the reference load angle based on the current level.

By including the reference load angle control circuitry in the motor controller, the reference load angle can be tuned based on the load torque and coil current of the motor to optimize the current level of the motor. As a result, a power efficiency of the motor can be improved. For example, when the load torque changes, the motor controller adjusts the current level (e.g., to prevent stalling) and the reference load angle control circuitry adjusts the reference load angle according to the change in current level. Adjusting the reference load angle can enable minimizing the current level, thereby improving the power efficiency of the motor.

Figure 1:
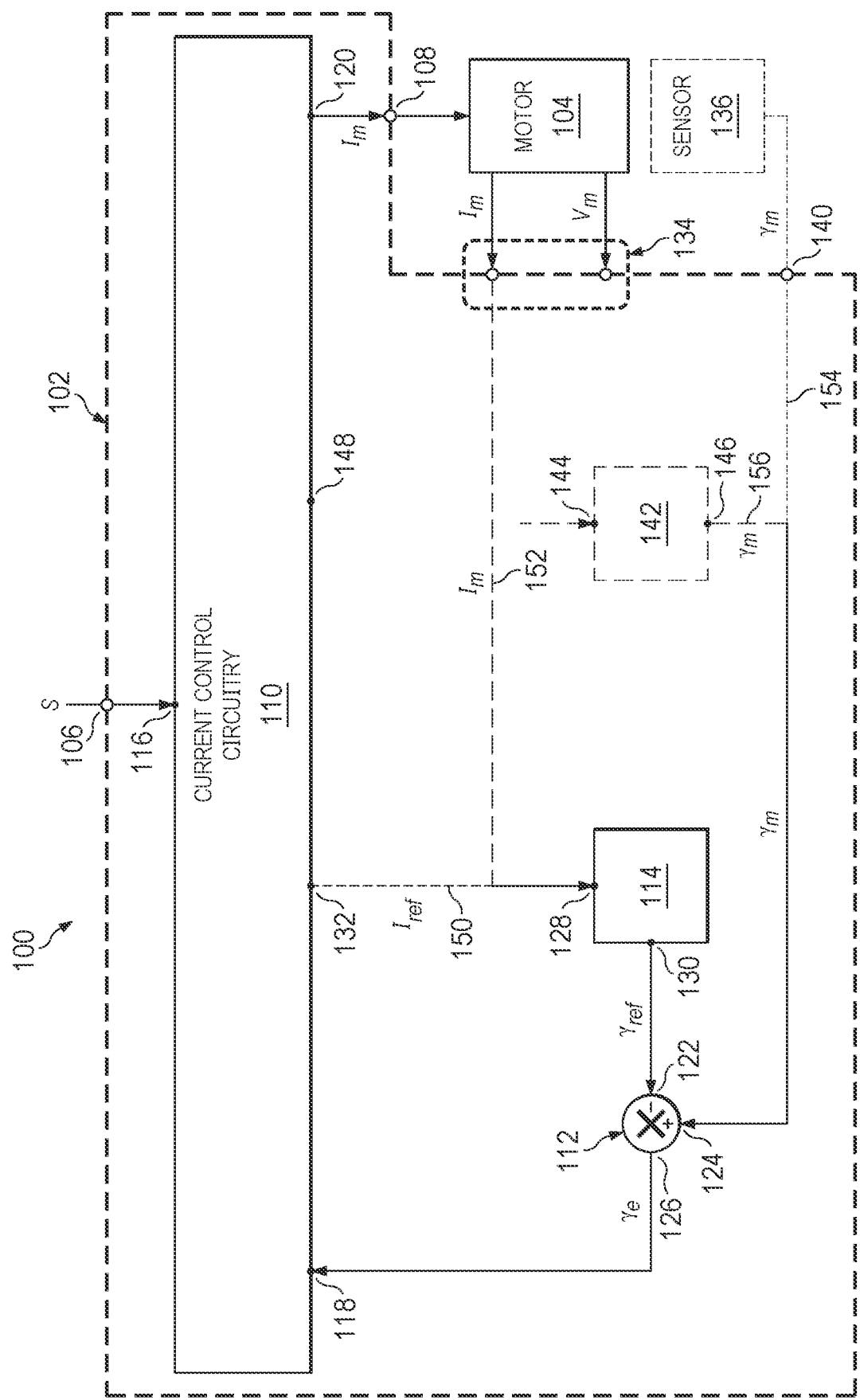
FIG. 1 is a diagram of some examples of a motor system including a motor controller and a motor.

FIG. 1 is a diagram 100 of some examples of a motor system including a motor controller 102 and a motor 104. The motor controller 102 controls the motor 104. In some examples, the motor 104 is a stepper motor or the like. The motor controller 102 has a first input 106 and an output 108. In some examples, the motor controller 102 has a second input 134 (e.g., a motor feedback input). Output 108 may be coupled to the motor 104.

The motor controller 102 includes current control circuitry 110, load angle error determination circuitry 112, and reference load angle control circuitry 114. In some examples, the current control circuitry 110, load angle error determination circuitry 112, and reference load angle control circuitry 114 are implemented using analog circuitry, using digital logic circuitry, using firmware on a microcontroller, using some combination of hardware and software, or the like. In some examples, some of the components of the motor controller 102 are implemented using analog circuitry while other components are implemented digitally such that the motor controller 102 includes a hybrid analog/digital configuration.

The current control circuitry 110 has a first input 116, a second input 118, and a first output 120. The load angle error determination circuitry 112 has a first input 122, a second input 124, and an output 126. The reference load angle control circuitry 114 has an input 128 and an output 130.

Input 116 of the current control circuitry 110 is coupled to input 106 of the motor controller 102. Output 120 of the current control circuitry 110 is coupled to output 108 of the motor controller 102. Output 130 of the reference load angle control circuitry 114 is coupled to input 122 of the load angle error determination circuitry 112. Output 126 of the load angle error determination circuitry 112 is coupled to input 118 of the current control circuitry 110.

In some examples, the current control circuitry 110 has a second output 132 coupled to input 128 of the reference load angle control circuitry 114, as shown by dashed line 150. In some other examples, input 134 of the motor controller 102 is coupled to input 128 of the reference load angle control circuitry 114, as shown by dashed line 152.

In some examples, the motor system includes a motor sensor 136. Further, the motor controller 102 has an input 140 to which an output of the motor sensor 136 may be coupled. In such examples, input 140 of the motor controller 102 is coupled to input 124 of the load angle error determination circuitry 112, as shown by dashed line 154. In some alternative examples, the motor controller 102 further includes motor load angle determination circuitry 142 having an input 144 and an output 146. The current control circuitry 110 may have a third output 148 to which input 144 of the motor load angle determination circuitry 142 may be coupled. Alternatively, input 144 may be coupled to input 134 of the motor controller 102. The coupling between input 144 and either output 148 or input 134 is not shown in FIG. 1 for clarity of illustration. Output 146 of the motor load angle determination circuitry 142 is coupled to input 124 of the load angle error determination circuitry 112, as shown by dashed line 156.

The motor controller 102 receives a step pulse signal S at input 106. The step pulse signal S includes a series of pulses (see, for example, step pulse signal S of FIG. 4). In some examples, an external controller or pulse generator provides the step pulse signal S to the motor controller 102. In some other examples, the motor controller 102 generates the step pulse signal S internally. A frequency of the step pulse signal S may be set by user input.

The current control circuitry 110 receives the step pulse signal S at input 116 and a load angle error $\gamma_e$ at input 118. In some examples, the current control circuitry 110 generates a motor current $I_m$ (see, for example, motor current components $I_{m,A}$ and $I_{m,B}$ of FIG. 4) for driving the motor 104 based on the step pulse signal S at input 116 and the load angle error $\gamma_e$ at input 118. In such examples, the current control circuitry 110 outputs the motor current $I_m$ at output 120. The current control circuitry 110 generates a reference current level $I_{ref}$ based on the load angle error $\gamma_e$. In some examples, the current control circuitry 110 outputs the reference current level $I_{ref}$ at output 132.

In some examples in which the motor system includes the motor sensor 136, the motor sensor 136 senses a motor load angle $\gamma_m$ indicating an angle between a stator magnetic field (e.g., 314 of FIG. 3) and a rotor magnetic field (e.g., 316 of FIG. 3) of the motor 104. The motor sensor 136 outputs the motor load angle $\gamma_m$ to input 140 of the motor controller 102. The motor controller 102 receives the motor load angle $\gamma_m$ at input 140 from the motor sensor 136.

In some examples in which the motor controller 102 includes motor load angle determination circuitry 142, the motor load angle determination circuitry 142 receives a duty cycle of the current control circuitry 110 from output 148 of the current control circuitry 110. The motor load angle determination circuitry 142 estimates the motor load angle $\gamma_m$ based on the duty cycle. In some alternative examples in which the motor controller 102 includes motor load angle determination circuitry 142, the motor load angle determination circuitry 142 receives a current level $I_m$ and a voltage level $V_m$ of the motor 104 from input 134 of the motor controller 102. The motor load angle determination circuitry 142 estimates the motor load angle $\gamma_m$ based on the current and voltage levels of the motor 104. The motor load angle determination circuitry 142 outputs the motor load angle $\gamma_m$ at output 146.

The load angle error determination circuitry 112 receives the motor load angle $\gamma_m$ from input 140 of the motor controller 102 or output 146 of the motor load angle determination circuitry 142. The load angle error determination circuitry 112 receives a reference load angle $\gamma_{ref}$ at input 122 from output 130 of the reference load angle control circuitry 114. The load angle error determination circuitry 112 determines the load angle error $\gamma_e$ based on a difference between the motor load angle $\gamma_m$ and the reference load angle $\gamma_{ref}$. In some examples, the load angle error $\gamma_e$ is equal to the difference between the motor load angle $\gamma_m$ and the reference load angle $\gamma_{ref}$. As such, the load angle error determination circuitry 112 is represented as a subtractor circuit in FIG. 1. The load angle error determination circuitry 112 outputs the load angle error $\gamma_e$ at output 126 to input 118 of the current control circuitry 110.

In some examples, the reference load angle control circuitry 114 receives the reference current level $I_{ref}$ at input 128 from output 132 of the current control circuitry 110. In some alternative examples, the reference load angle control circuitry 114 receives the motor current $I_m$ level at input 128 from input 134 of the motor controller 102. The reference load angle control circuitry 114 controls the reference load angle $\gamma_{ref}$ based on the reference current level $I_{ref}$ or the level of the motor current $I_m$. Thus, the reference load angle $\gamma_{ref}$ may be referred to as being adaptive. In some examples, the reference load angle control circuitry 114 sets the reference load angle $\gamma_{ref}$ according to a formula (e.g., a linear equation, a polynomial equation, or some other suitable equation) in which the reference current level $I_{ref}$ or the level of the motor current $I_m$ is the input and the reference load angle $\gamma_{ref}$ is the output. In some other examples, the reference load angle control circuitry 114 sets the reference load angle $\gamma_{ref}$ based on the reference current level $I_{ref}$ or the level of the motor current $I_m$ using a lookup table having a set of stored (e.g., predetermined) reference load angles $\gamma_{ref}$ and a respective set of reference current levels or motor current levels. The reference load angle control circuitry 114 sets the reference load angle $\gamma_{ref}$ to the maximum reliable load angle for a given reference current level $I_{ref}$ or motor current $I_m$ level so that a suitable margin of safety from stall is achieved with maximum power efficiency. The reference load angle control circuitry 114 outputs the reference load angle $\gamma_{ref}$ at output 130.

By including the reference load angle control circuitry 114 in the motor controller 102, the reference load angle $\gamma_{ref}$ can be tuned according to changes in the load torque. Thus, the reference load angle $\gamma_{ref}$ and the reference current level $I_{ref}$ or the motor current $I_m$ can be optimized according to the load torque. As a result, a power efficiency of the motor system can be improved. For example, in response to changes in the load torque, the current control circuitry 110 adjusts the reference current level $I_{ref}$ (and thus the motor current $I_m$) and the reference load angle control circuitry 114 adjusts the reference load angle $\gamma_{ref}$ accordingly. Because the reference load angle $\gamma_{ref}$ can be adjusted with changes in the load torque, the current level of the motor 104 (e.g., the reference current level $I_{ref}$ and/or the level of the motor current $I_m$) can be minimized, thereby improving an efficiency of the motor.

Figure 2:
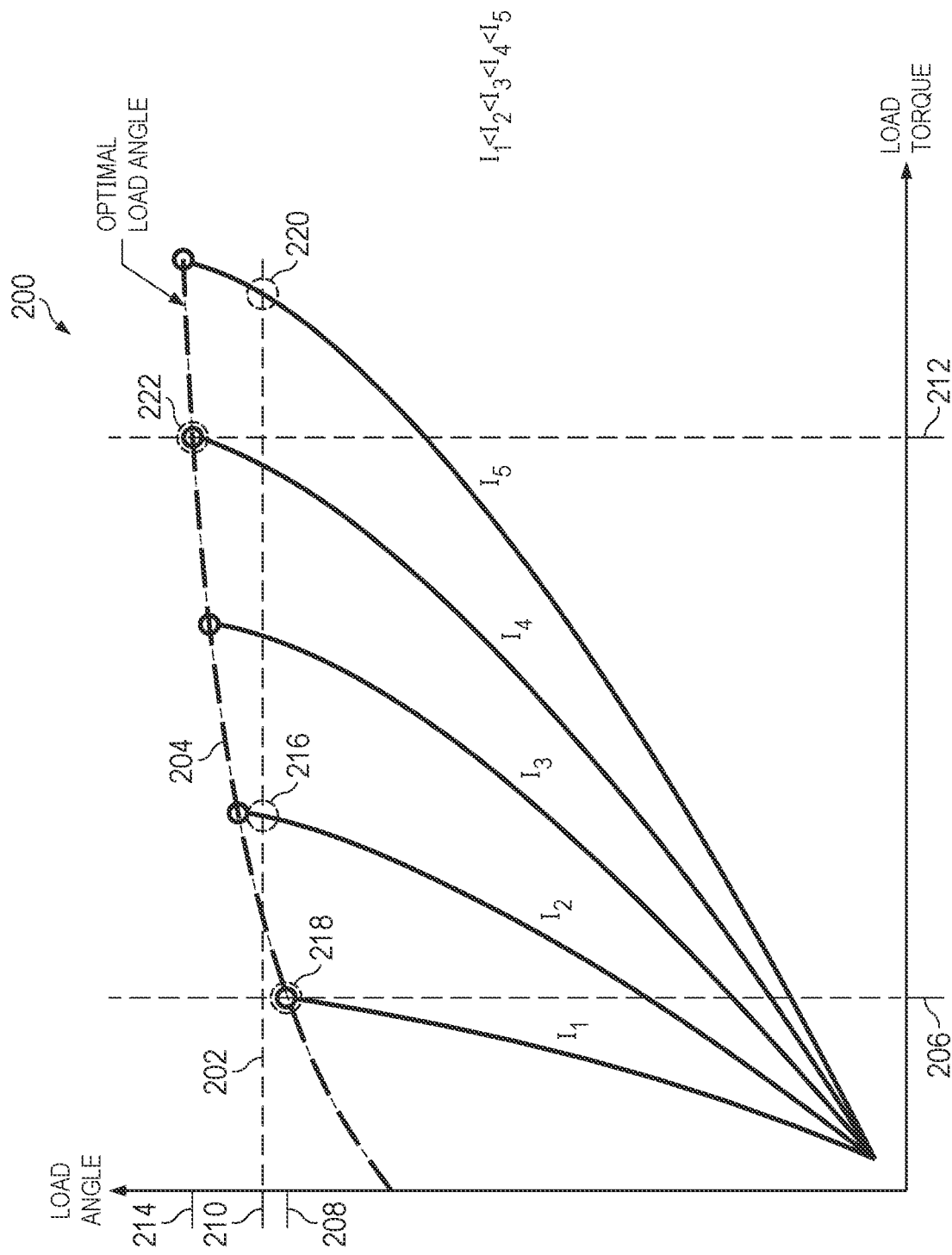
FIG. 2 is a graph of a fixed reference load angle, an adaptive reference load angle, and a plurality of current levels across a range of load torques.

FIG. 2 is a graph 200 of a fixed reference load angle, an adaptive reference load angle, and a plurality of current levels $I_1$-$I_5$ across a range of load torques.

At a given load, the optimal load angle is the load angle at which the motor (e.g., 104 of FIG. 1) operates when the motor is driven using the minimum reliable motor current (e.g., the minimum motor current that allows the motor to operate without stalling) for the given load torque. The optimal load angle varies with motor current. For example, the optimal load angle is smaller at lower motor currents (due to increased vulnerability to stalling at lower motor currents) and larger at higher motor currents. When using a fixed reference load angle (e.g., as illustrated by line 202) to control the motor, a power efficiency of the motor is reduced. For example, when using a fixed reference load angle, the reference load angle may be different than the optimal load angle at some loads. When the reference load angle is different than the optimal load angle, the magnitude of the current used to drive the motor may be larger than necessary. Thus, a power efficiency of the motor may be reduced.

In contrast, when using an adaptive reference load angle (e.g., as illustrated by line 204) to control the motor, a power efficiency of the motor can be improved. For example, the adaptive reference load angle is approximately equal to the optimal load angle across a range of load torques. Thus, the magnitude of the current used to drive the motor can be minimized. As a result, a power efficiency of the motor can be improved.

In one example, the load torque at a first time is equal to a first torque 206. The minimum reliable current level which can enable the motor to produce at least the first torque 206 is a first current level $I_1$. The first current level $I_1$ can enable the motor to produce at least the first torque 206 when the motor load angle is equal to a first angle 208. In the example, the fixed reference load angle is equal to a second angle 210, greater than the first angle 208. When controlling the motor according to the fixed reference load angle, the current level of the motor must be at least equal to a second current level $I_2$, greater than the first current level $I_1$, to enable the motor to produce at least the first torque 206. This is because the second current level $I_2$ is the lowest current level which drives the motor to produce at least the first torque 206 when operating with a load angle equal to the second angle 210. In other words, the second current level $I_2$ is the lowest (e.g., leftmost) current level which intersects with the fixed reference load angle (e.g., line 202) at a torque that is greater than or equal to the first torque 206, as shown by dashed circle 216.

In contrast, when using the adaptive reference load angle, the current level of the motor can be set to the first current level $I_1$ because the adaptive reference load angle can be adjusted to the first angle 208 so the motor produces at least the first torque 206 with the first current level $I_1$. In other words, the first current level $I_1$ is the lowest (e.g., leftmost) current level which intersects with the adaptive reference load angle (e.g., line 204) at a load torque that is greater than or equal to the first torque 206, as shown by dashed circle 218.

In another example, the load torque at a second time is equal to a second torque 212. The minimum reliable current level which can enable the motor to produce at least the second torque 212 is a fourth current level $I_4$. The fourth current level $I_4$ can enable the motor to produce at least the second torque 212 when the motor load angle is equal to a third angle 214. However, when controlling the motor according to the fixed reference load angle, the current level of the motor must be at least equal to a fifth current level $I_5$, greater than the fourth current level $I_4$, to enable the motor to produce at least the second torque 212. This is because the fifth current level $I_5$ is the lowest current level which drives the motor to produce at least the second torque 212 when operating with the motor load angle equal to the third angle 214. In other words, the fifth current level $I_5$ is the lowest (e.g., leftmost) current level which intersects with the fixed reference load angle (e.g., line 202) at a load torque that is greater than or equal to the second torque 212, as shown by dashed circle 220.

In contrast, when using the adaptive reference load angle, the motor current can be set to the fourth current level $I_4$ because the adaptive reference load angle can be adjusted to the third angle 214 so the motor produces at least the second torque 212 with the fourth current level $I_4$. In other words, the fourth current level $I_4$ is the lowest (e.g., leftmost) current level which intersects with the adaptive reference load angle (e.g., line 204) at a load torque that is greater than or equal to the second torque 212, as shown by dashed circle 222. Although five discrete current levels (e.g., $I_1$-$I_5$) are shown in FIG. 2, the motor controller may be capable of operating the motor using some other number of current levels.

Figure 3:
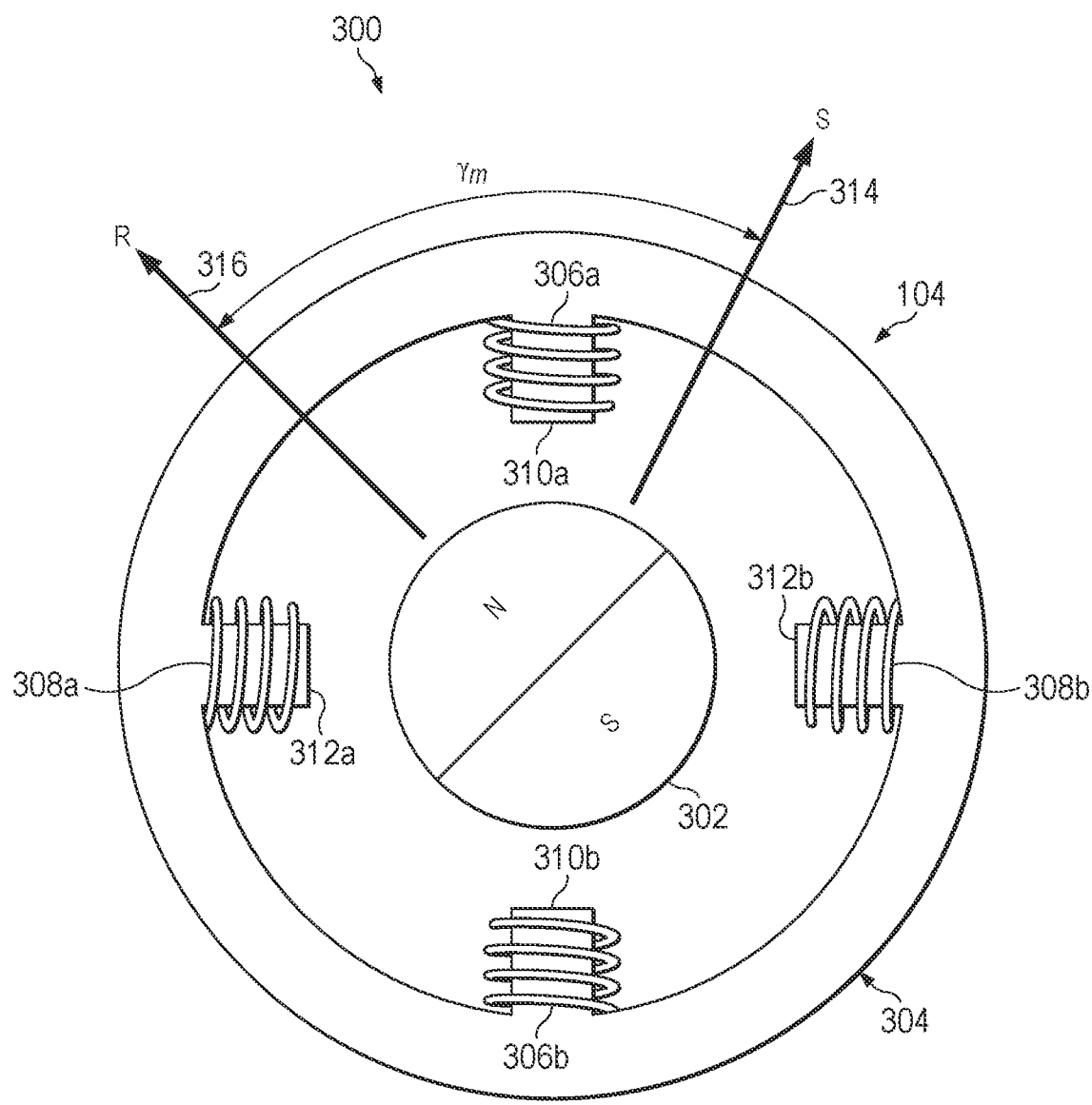
FIG. 3 is a diagram of some examples of the motor of FIG. 1.

FIG. 3 is a diagram 300 of some examples of the motor 104 of FIG. 1. The motor 104 includes a rotor 302 and a stator 304. The rotor 302 includes a permanent magnet having a north pole and a south pole. The rotor 302 rotates about a rotor axis. In the example illustrated in FIG. 3, the rotor axis extends into the page and is located at the center of rotor 302. The net direction of magnetization of the rotor (e.g., illustrated by arrow 316) may be referred to as the rotor magnetic field.

The stator 304 includes a plurality of windings 306a, 306b, 308a, 308b that surround a plurality of cores 310a, 310b, 312a, 312b, respectively. The windings may be coupled to the motor controller (e.g., 102 of FIG. 1) via a motor controller output (e.g., 108 of FIG. 1). Current(s) may be passed through the windings in a sequential manner to excite the motor 104 to cause the rotor 302 to rotate. For example, when current passes through the windings 306a, 306b, 308a, 308b, a magnetic field is generated that surrounds the windings. The magnetic fields generated around each of the windings together have a net direction of magnetization (e.g., as illustrated by arrow 314), which may be referred to as the stator magnetic field. The motor load angle $\gamma_m$ is the angular difference between the stator magnetic field (e.g., as illustrated by arrow 314) and the rotor magnetic field (e.g., as illustrated by arrow 316).

Figure 4:
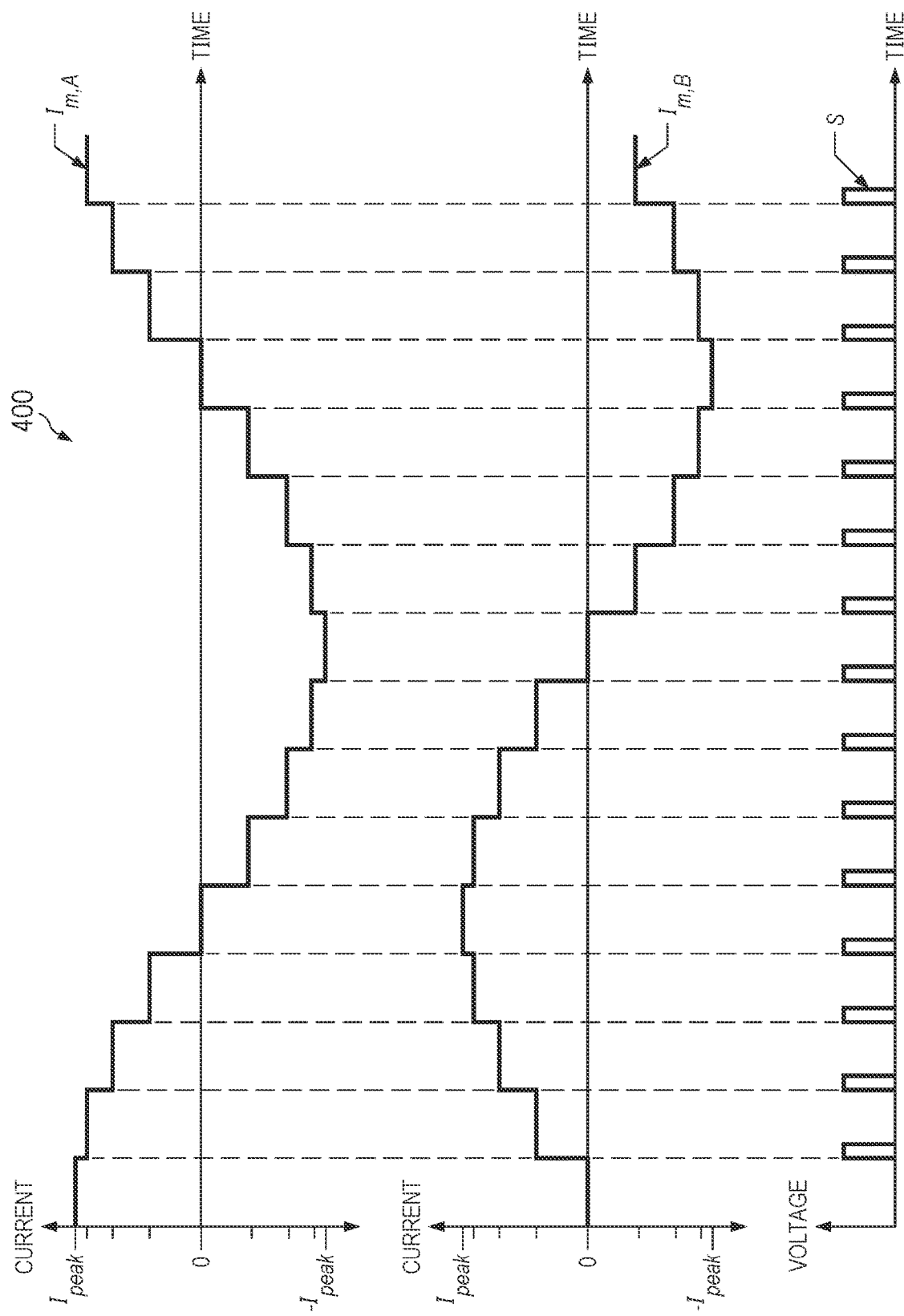
FIG. 4 is a timing diagram showing an example motor current and an example step pulse signal over time.

FIG. 4 is a timing diagram 400 showing an example motor current and an example step pulse signal over time. The motor current (e.g., $I_m$ of FIG. 1) includes a first component $I_{m,A}$ (e.g., a first phase) that is provided to first windings (e.g., 306a, 306b of FIG. 3) of the motor and a second component $I_{m,B}$ (e.g., a second phase) that is provided to second windings (e.g., 308a, 308b of FIG. 3) of the motor. The first component $I_{m,A}$ and the second component $I_{m,B}$ of the motor current are set to be approximately 90 degrees out of phase, as shown in FIG. 4.

The number current levels in the motor current components corresponds to the number of discrete positions of the motor. Thus, the total number of discrete positions at which the motor may be positioned may vary depending on the number of current levels that the motor controller can generate. The number of current levels that the motor controller can generate may depend on the resolution of the current control circuitry (e.g., 110 of FIG. 1). For example, some motor controllers may be able to provide eight different current levels and thus command the motor to move between eight different positions. Some other motor controllers may be able to provide sixteen different current levels and thus command the motor to move between sixteen different positions. Other numbers of current levels and positions are also possible. In the example illustrated in FIG. 4, the motor is commanded to move periodically in a first direction (e.g., clockwise) between sixteen different positions using sixteen different current levels which range from a zero level to a peak level $I_{peak}$ in magnitude.

The step pulse signal S includes a series of pulses. The frequency of the pulses of the step pulse signal S determines the speed at which the motor rotates. Each step pulse in the step pulse signal S causes the motor to step to the next discrete position. Thus, the number of step pulses in the step pulse signal S determine the position of the motor.

Figure 5:
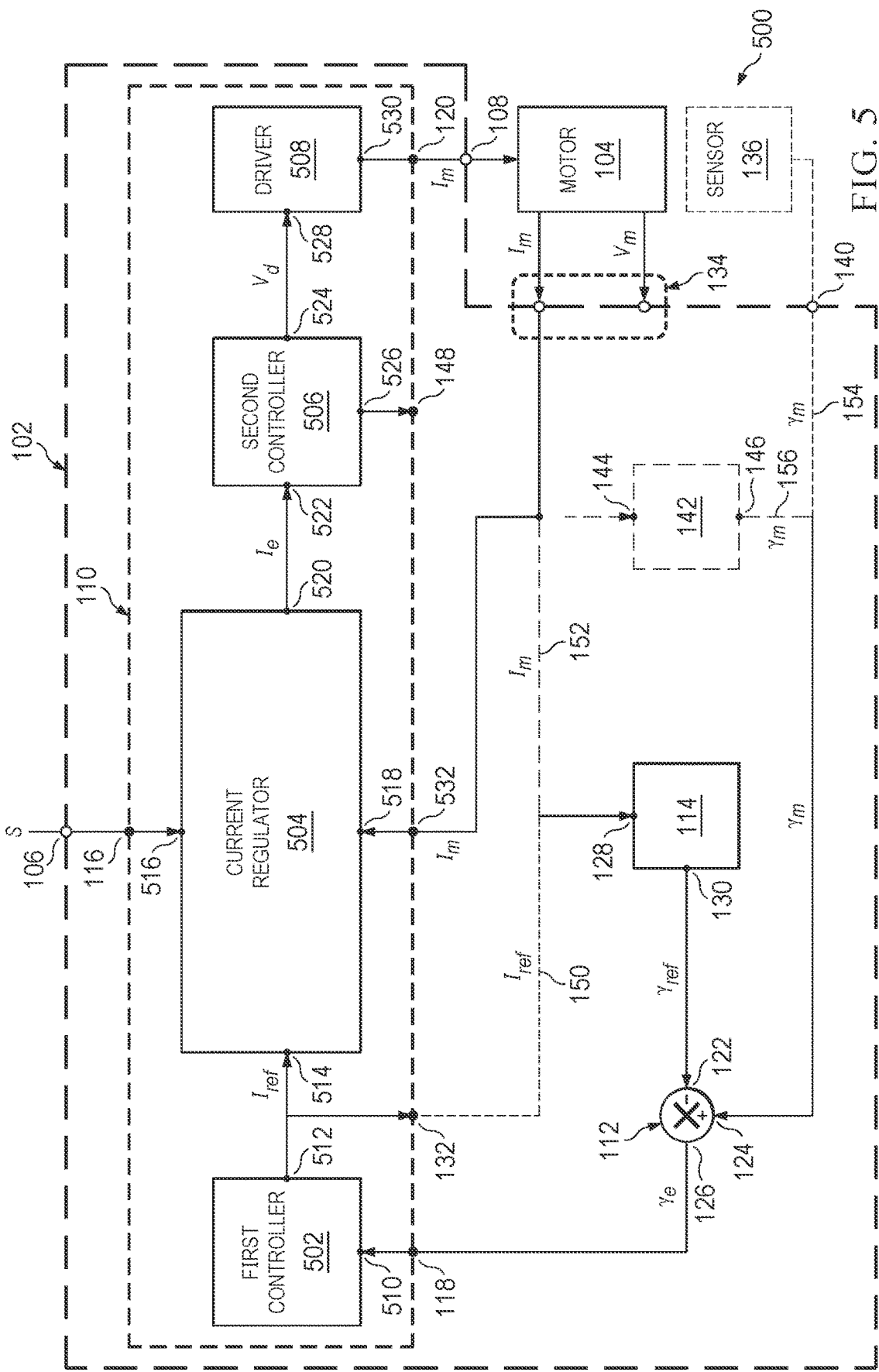
FIG. 5 is a diagram of some other examples of the motor system of FIG. 1.

FIG. 5 is a diagram 500 of some examples of the motor system of FIG. 1 in which the current control circuitry 110 includes first controller circuitry 502, current regulator circuitry 504, and second controller circuitry 506. In some examples, the current control circuitry 110 further includes motor driver circuitry 508. In some alternative examples, the motor driver circuitry 508 is external to the motor controller 102 and coupled between the motor controller 102 and the motor 104. In some examples, controller circuitry 502 is or includes a proportional-integral-derivative (PID) controller or the like. In some examples, controller circuitry 506 includes a PID controller, a pulse width modulation signal generator, or the like. In some examples, the motor driver circuitry 508 includes a plurality of transistor devices (e.g., metal-oxide-semiconductor field effect transistors or the like).

Controller circuitry 502 has an input 510 and an output 512. The current regulator circuitry 504 has a first input 514, a second input 516, a third input 518, and an output 520. Controller circuitry 506 has an input 522 and a first output 524. In some examples, controller circuitry 506 has a second output 526. The motor driver circuitry 508 has an input 528 and an output 530. The current control circuitry 110 has an input 532.

Input 510 of controller circuitry 502 is coupled to output 126 of the load angle error determination circuitry 112. Output 512 of controller circuitry 502 is coupled to input 514 of the current regulator circuitry 504. In some examples, output 512 is coupled to input 128 of the reference load angle control circuitry 114 (e.g., via output 132 of the current control circuitry 110). Input 516 of the current regulator circuitry 504 is coupled to input 106 of the motor controller 102. In some examples, input 518 of the current regulator circuitry 504 is coupled to input 134 of the motor controller 102 (e.g., via input 532). Output 520 of the current regulator circuitry 504 is coupled to input 522 of controller circuitry 506. Output 524 of controller circuitry 506 is coupled to input 528 of the motor driver circuitry 508. In some examples, output 526 of controller circuitry 506 is coupled to input 144 of the motor load angle determination circuitry 142 (e.g., via output 148). Output 530 of the motor driver circuitry 508 is coupled to output 108 of the motor controller 102.

Controller circuitry 502 receives the load angle error $\gamma_e$ at input 510. Controller circuitry 502 controls the reference current level $I_{ref}$ based on the load angle error $\gamma_e$. The reference current level $I_{ref}$ determines the peak current level (e.g., $I_{peak}$ of FIG. 4) of the motor current $I_m$. Controller circuitry 502 outputs the reference current $I_{ref}$ at output 512.

The current regulator circuitry 504 receives the reference current level $I_{ref}$ at input 514, the step pulse signal S at input 516, and the motor current $I_m$ at input 518. In some examples, the current regulator circuitry 504 receives the motor current $I_m$ at input 518 from input 134 of the motor controller 102. The current regulator circuitry 504 generates a current error $I_e$ based on the reference current level $I_{ref}$, the step pulse signal S, and the motor current $I_m$. The current regulator circuitry 504 outputs the current error $I_e$ at output 520.

Controller circuitry 506 receives the current error $I_e$ at input 522. Controller circuitry 506 controls a driver control signal $V_d$ based on the current error $I_e$. In some examples, the driver control signal $V_d$ is a pulse width modulated voltage signal for controlling control inputs (e.g., gate electrodes) of the transistors of the motor driver circuitry 508. Controller circuitry 506 outputs the driver control signal $V_d$ at output 524. In some examples, controller circuitry 506 outputs the duty cycle of the driver control signal $V_d$ at output 526.

The motor driver circuitry 508 receives the driver control signal $V_d$ at input 528. The motor driver circuitry 508 generates the motor current $I_m$ based on the driver control signal $V_d$. For example, the transistors of the motor driver circuitry 508 are switched according to the driver control signal to control the current provided to the motor from the motor driver circuitry 508. The motor driver circuitry 508 outputs the motor current $I_m$ at output 530.

Figure 6:
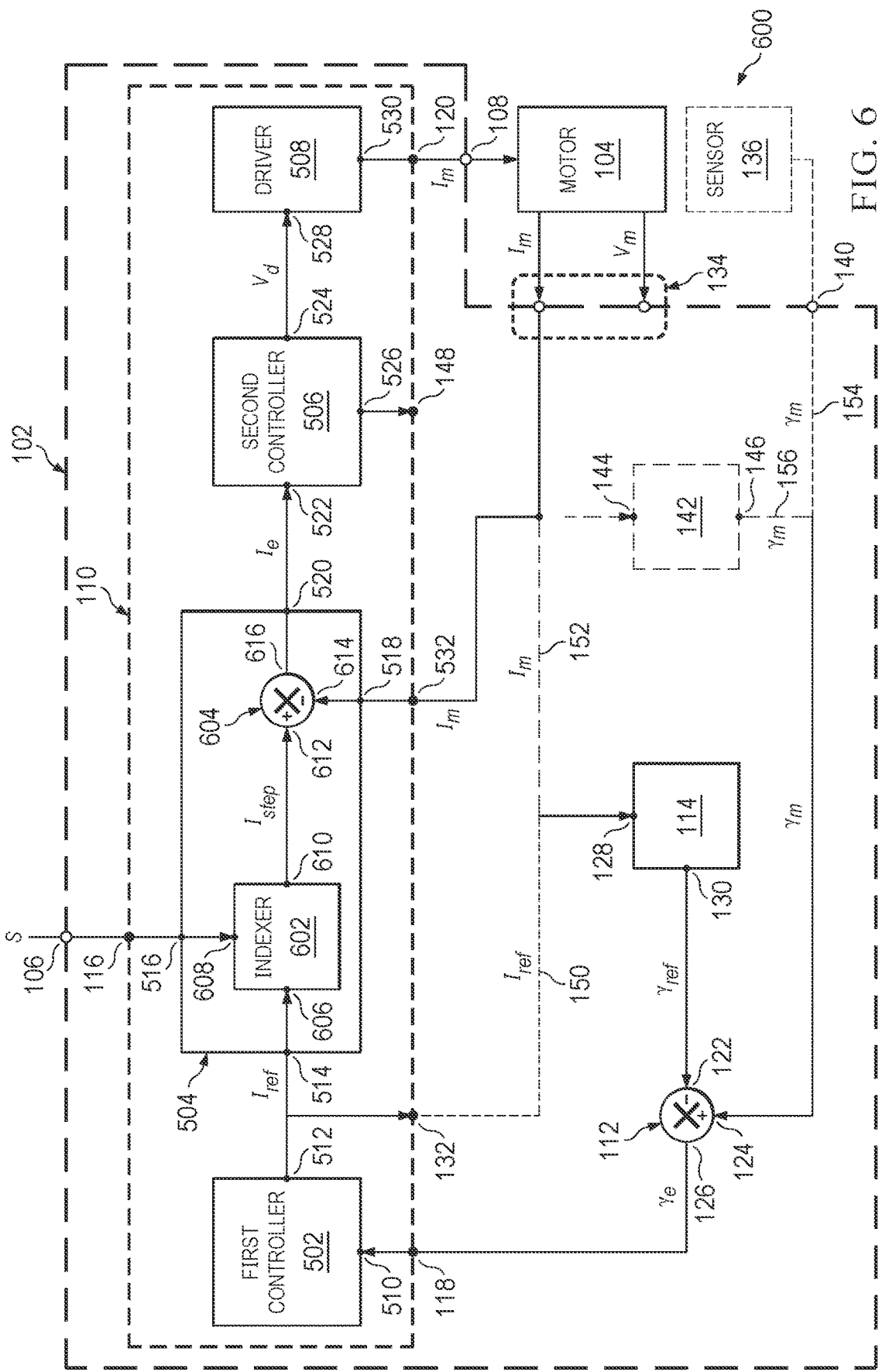
FIG. 6 is a diagram of some other examples of the motor system of FIG. 5.

FIG. 6 is a diagram 600 of some examples of the motor system of FIG. 5 in which the current regulator circuitry 504 includes micro-stepping indexer circuitry 602 and current error determination circuitry 604. In some examples, the current error determination circuitry 604 is or includes an error amplifier, a current comparator, an adder or subtractor, or the like. The micro-stepping indexer circuitry 602 has a first input 606, a second input 608, and an output 610. The current error determination circuitry 604 has a first input 612, a second input 614, and an output 616.

Input 606 of the micro-stepping indexer circuitry 602 is coupled to output 512 of controller circuitry 502. Input 608 of the micro-stepping indexer circuitry 602 is coupled to input 106 of the motor controller 102. Output 610 of the micro-stepping indexer circuitry 602 is coupled to input 612 of current error determination circuitry 604. Input 614 of the current error determination circuitry 604 is coupled to input 134 of the motor controller 102. Output 616 of the current error determination circuitry 604 is coupled to input 522 of controller circuitry 506.

The micro-stepping indexer circuitry 602 receives the reference current level $I_{ref}$ at input 606 and the step pulse signal S at input 608. The micro-stepping indexer circuitry 602 generates step current levels $I_{step}$ based on the reference current level $I_{ref}$ (e.g., the peak current level) and the step pulse signal S. The step currents levels $I_{step}$ are the levels of the individual currents of the windings. For example, the step currents levels $I_{step}$ correspond to the levels of the components $I_{m,A}$ and $I_{m,B}$ of the motor current $I_m$ shown in the timing diagram of FIG. 4. The sum of the step currents levels $I_{step}$ at a given time is equal to the reference current level $I_{ref}$. The micro-stepping indexer circuitry 602 outputs the step current levels $I_{step}$ at output 610.

The current error determination circuitry 604 receives the step current levels $I_{step}$ at input 612 and the level(s) of the motor current $I_m$ (e.g., the levels of the components $I_{m,A}$ and $I_{m,B}$ of the motor current $I_m$ shown in the timing diagram of FIG. 4) at input 614. The current error determination circuitry 604 determines a current error $I_e$ based on a difference between the step current levels $I_{step}$ and the level(s) of the motor current $I_m$. In some examples, the current error $I_e$ is equal to the difference between the step current levels $I_{step}$ and the motor current levels $I_m$. The current error determination circuitry 604 outputs the current error $I_e$ at output 616.

Figure 7:
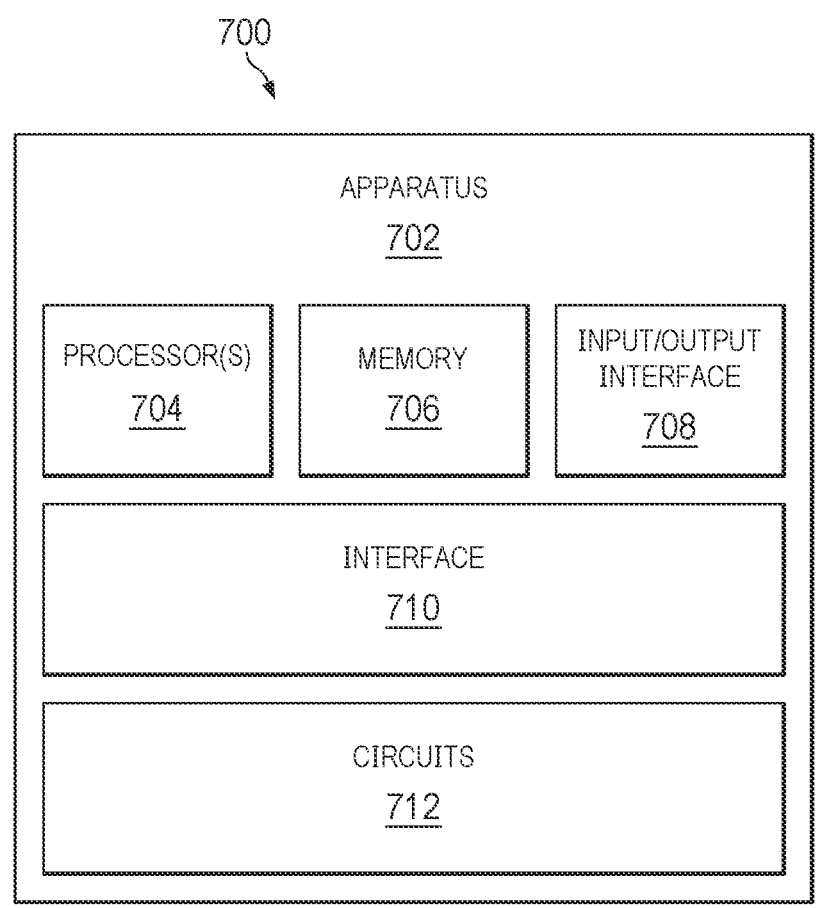
FIG. 7 is a diagram of an example apparatus that can facilitate controlling a motor according to various examples.

FIG. 7 is a diagram 700 of an example apparatus 702 that can facilitate controlling a motor according to various examples discussed herein. Apparatus 702 can perform various techniques discussed herein, for example, various operations and/or functions discussed in connection with methods 800 and/or 1400. Apparatus 702 includes one or more processors 704. Apparatus 702 also includes a memory 706. Processor(s) 704 can, in various examples, include circuitry such as, but not limited to, one or more single-core or multi-core processors. Processor(s) 704 can include any combination of general-purpose processors and dedicated processors (e.g., graphics processors, application processors, etc.). The processor(s) can be coupled with and/or can include memory (e.g., of memory 706) or storage and can execute instructions stored in the memory 706 or storage to enable various apparatus, applications, or operating systems to perform operations and/or methods discussed herein.

Apparatus 702 also includes an input/output (I/O) interface 708 (e.g., associated with one or more I/O devices), circuits 712, and an interface 710 that connects the processor(s) 704, the memory 706, the I/O interface 708, and the circuits 712. I/O interface 708 can transfer data between memory 706, processor 704, circuits 712, and external devices. The processor(s) 704 and/or one or more of the circuits 712 can perform one or more functions associated with a method or set of operations discussed herein, such as methods 800 and/or 1400.

In some examples, apparatus 702 is a microcontroller having one or more processors, a memory, interfaces, etc. In some alternative examples, apparatus 702 is implemented using custom circuitry.

Figure 8:
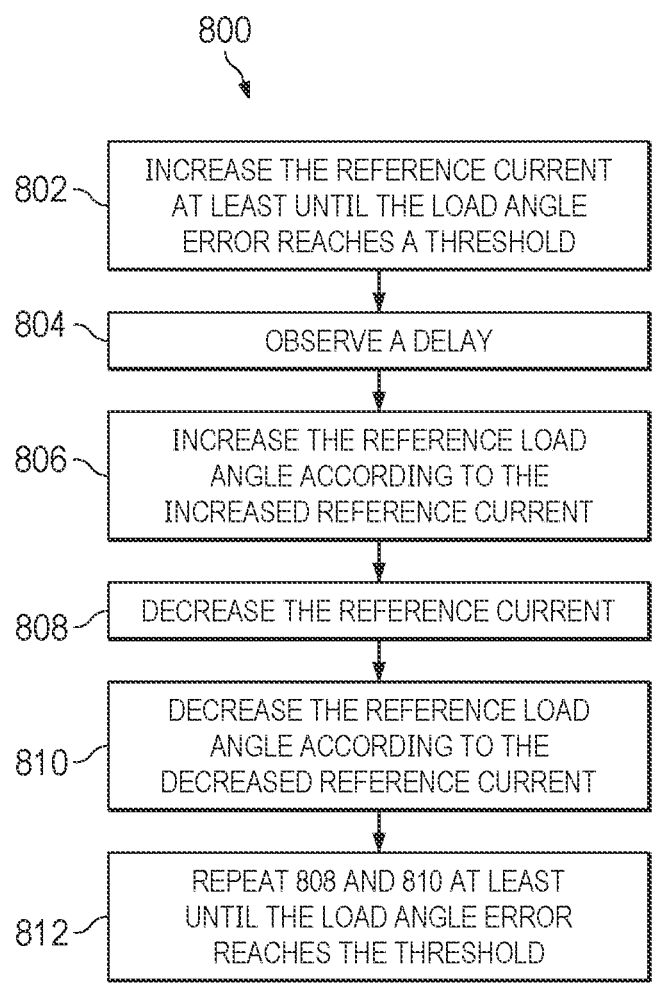
FIG. 8 is a flow diagram of some examples of a method for controlling a motor.

FIG. 8 is a flow diagram of some examples of a method 800 for controlling a motor in response to an increase in a load torque of the motor. When the load torque increases, the motor load angle $\gamma_m$ increases but the reference load angle $\gamma_{ref}$ remains unchanged. Thus, the load angle error $\gamma_e$ increases.

At block 802, the method includes increasing the reference current level $I_{ref}$ at least until the load angle error $\gamma_e$ reaches a threshold. In some examples, the motor controllers of FIGS. 1, 5, and 6 and the apparatus of FIG. 7 perform the function indicated at block 802. For instance, in response to the increase in the load angle error $\gamma_e$, controller circuitry 502 increases the reference current level $I_{ref}$ at least until the load angle error $\gamma_e$ reaches a threshold (e.g., until a magnitude of the load angle error reaches a magnitude of the threshold). Increasing the reference current level $I_{ref}$ causes the motor current $I_m$ to be increased accordingly. In some examples, the threshold is equal to zero. In some other examples, the threshold is a magnitude threshold equal to a small angle. For example, the threshold can range from about −2 degrees to about 2 degrees, −1 degree to 1 degree, −0.5 to 0.5 degrees, or some other suitable range.

At block 804, the method includes observing a delay. In some examples, the motor controllers of FIGS. 1, 5, and 6 and the apparatus of FIG. 7 perform the function indicated at block 804. For instance, in response to the increase in the reference current level $I_{ref}$, the reference load angle control circuitry 114 waits a predetermined amount of time before adjusting the reference load angle $\gamma_{ref}$. In some examples, the delay is used to ensure reliable operation of the motor and reduce a likelihood of stalling.

At block 806, the method includes increasing the reference load angle $\gamma_{ref}$ according to the increased reference current level $I_{ref}$ (or the increased motor current $I_m$). In some examples, the motor controllers of FIGS. 1, 5, and 6 and the apparatus of FIG. 7 perform the function indicated at block 806. For instance, following the delay, the reference load angle control circuitry 114 increases the reference load angle $\gamma_{ref}$ based on the increased reference current level $I_{ref}$ (or the increased motor current $I_m$). In some examples, the reference load angle $\gamma_{ref}$ is calculated using a formula (e.g., $\gamma_{ref}=K_1*I+K_2$, where $K_1$ and $K_2$ are adjustable coefficients and I is the reference current level or the motor current level). In some other examples, the reference load angle $\gamma_{ref}$ is determined using a lookup table or the like. Although the reference load angle $\gamma_{ref}$ is changed, the motor load angle $\gamma_m$ remains approximately unchanged. Thus, the magnitude of the load angle error $\gamma_e$ increases (e.g., the load angle error $\gamma_e$ becomes negative).

At block 808, the method includes decreasing the reference current level $I_{ref}$. In some examples, the motor controllers of FIGS. 1, 5, and 6 and the apparatus of FIG. 7 perform the function indicated at block 808. For instance, in response to the increase in the reference load angle $\gamma_{ref}$ (and thus the load angle error $\gamma_e$ becoming negative), controller circuitry 502 decreases the reference current level $I_{ref}$. The amount by which the reference current level $I_{ref}$ is decreased may be small so that the reference current level $I_{ref}$ is gradually decreased. Gradually decreasing the reference current level $I_{ref}$ reduces a likelihood of motor stall. Decreasing the reference current level $I_{ref}$ causes the motor current $I_m$ to be decreased accordingly.

At block 810, the method includes decreasing the reference load angle $\gamma_{ref}$ according to the decreased reference current level $I_{ref}$ (or the decreased motor current $I_m$). In some examples, the motor controllers of FIGS. 1, 5, and 6 and the apparatus of FIG. 7 performs the function indicated at block 810. For instance, in response to the decrease in the reference current level $I_{ref}$ (or the motor current $I_m$), the reference load angle control circuitry 114 decreases the reference load angle $\gamma_{ref}$ based on the decreased reference current level $I_{ref}$ (or the decreased motor current $I_m$).

At block 812, the method includes repeating the functions indicated at blocks 808 and 810 at least until the load angle error $\gamma_e$ reaches the threshold. In some examples, the motor controllers of FIGS. 1, 5, and 6 and the apparatus of FIG. 7 perform the function indicated at block 812. When the load angle error $\gamma_e$ reaches the threshold, the motor current $I_m$ is at the lowest reliable level for the new load torque and the reference load angle $\gamma_{ref}$ is optimized for the new load torque. Thus, an efficiency of the motor may be improved.

FIGS. 9-13 are graphs 900-1300 illustrating example current levels and load angles of the motor controller and the motor over time according to the method of FIG. 8.

Figure 9:
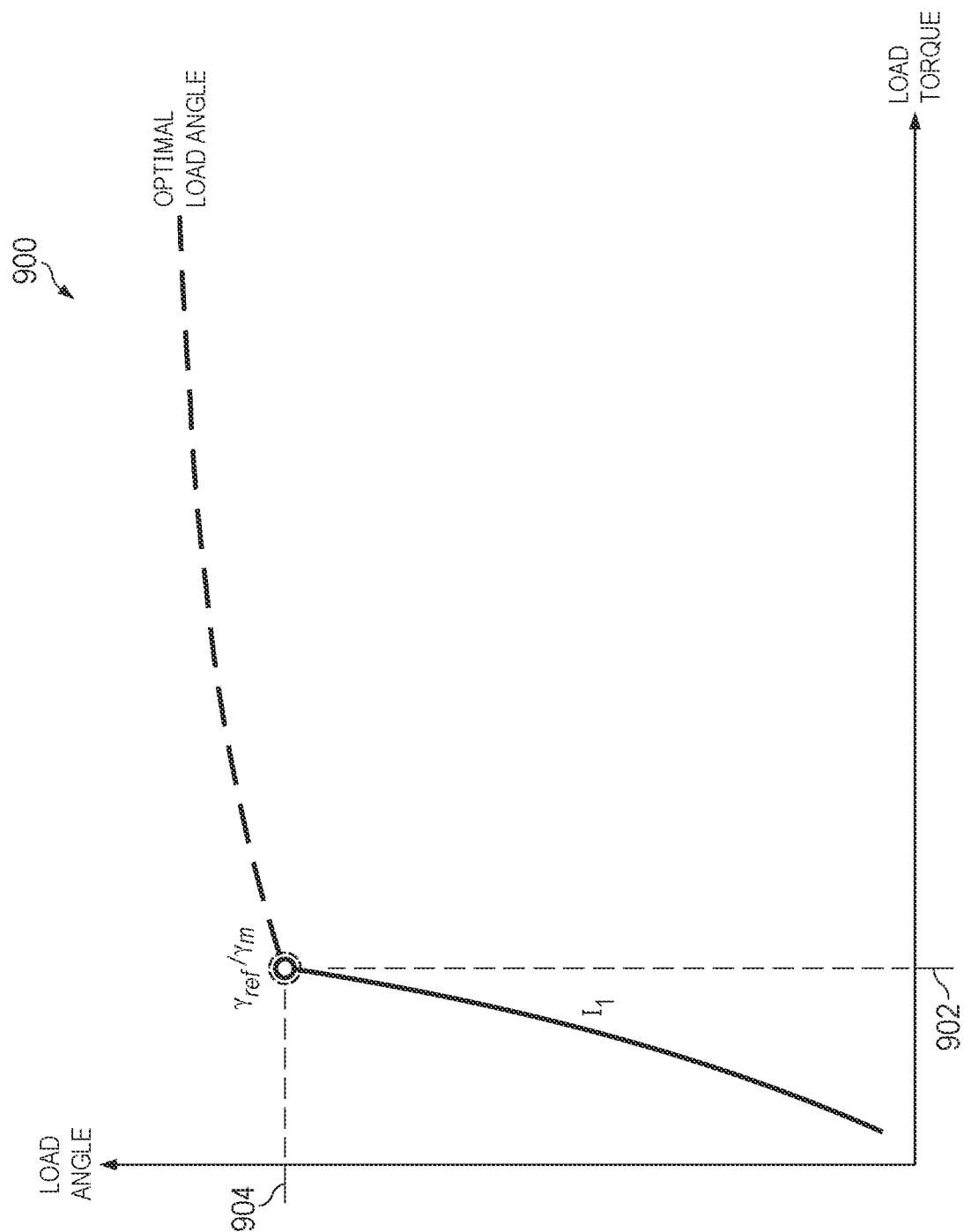
FIGS. 9-13 are graphs illustrating example current levels and load angles of the motor controller and the motor over time according to the method of FIG. 8.

At FIG. 9, the load torque is equal to a first torque 902 and the reference current level $I_{ref}$ is equal to a first current level $I_1$. The motor load angle $\gamma_m$ and the reference load angle $\gamma_{ref}$ are equal to a first angle 904.

Figure 10:
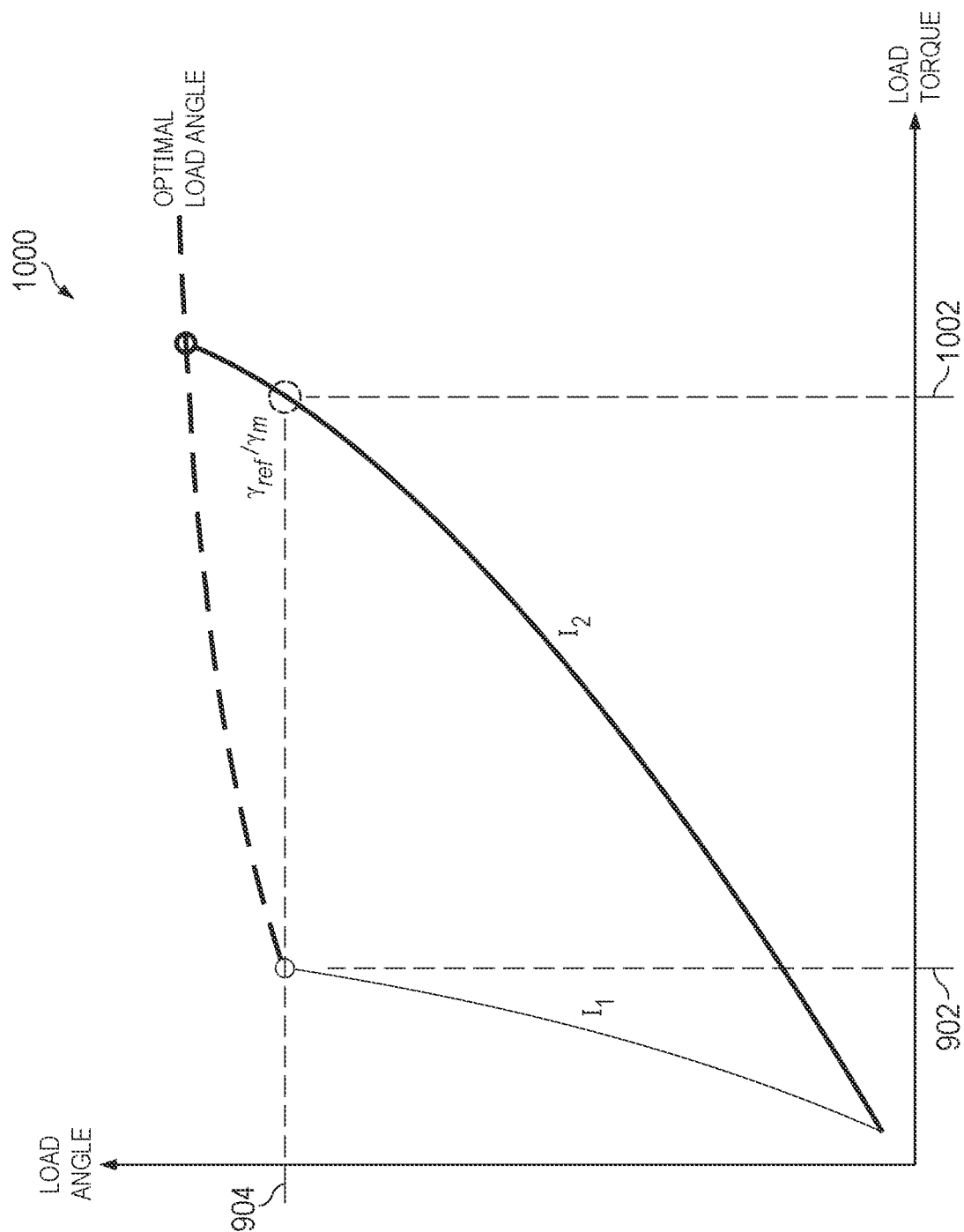

At FIG. 10, the load torque increases from the first torque 902 to a second torque 1002. As a result, the load angle error $\gamma_e$ increases. In response, the reference current level $I_{ref}$ is increased (e.g., by controller circuitry 502) at least until the load angle error reaches a threshold. For example, the reference current level $I_{ref}$ is increased from the first current level $I_1$ to a second current level $I_2$. Increasing the reference current $I_{ref}$ (and thus the motor current $I_m$) protects the motor from stalling in response to the increase in the load torque. The reference current level $I_{ref}$ is increased to the second current level $I_2$ because the motor load angle $\gamma_m$ is approximately equal to the first angle 904 when the reference current level $I_{ref}$ is equal to the second current level $I_2$.

Figure 11:
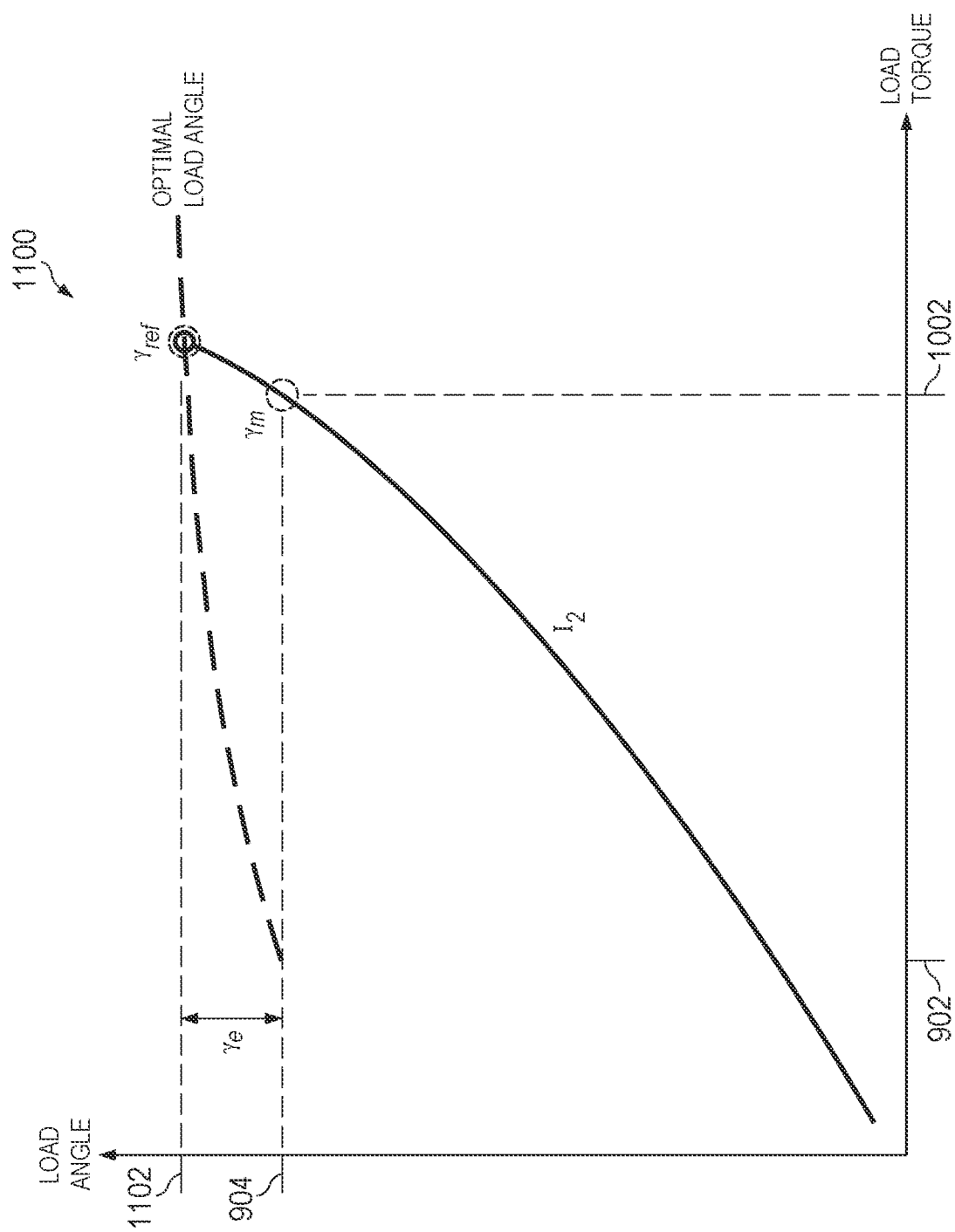

At FIG. 11, the reference load angle $\gamma_{ref}$ is increased according to the increased reference current level $I_{ref}$. For example, the reference load angle $\gamma_{ref}$ is increased (e.g., by the reference load angle control circuitry 114) from the first angle 904 to a second angle 1102. The second angle 1102 is determined (e.g., by the reference load angle control circuitry 114) based on the second current level $I_4$ (e.g., according to a formula or a lookup table).

The motor load angle $\gamma_m$ remains approximately unchanged when the reference load angle $\gamma_{ref}$ is increased. For example, when the reference load angle is increased from the first angle 904 to the second angle 1102, the motor load angle $\gamma_m$ remains equal to the first angle 904. Thus, the magnitude of the load angle error $\gamma_e$ changes. For example, the reference load angle $\gamma_{ref}$ is greater than the motor load angle $\gamma_m$ and thus the load angle error $\gamma_e$ changes from approximately zero to a negative value.

Before the reference load angle $\gamma_{ref}$ is increased according to the increased reference current level $I_{ref}$, a delay is observed. For example, the reference load angle control circuitry 114 waits an amount of time before increasing the reference load angle $\gamma_{ref}$ according to the increased reference current level $I_{ref}$.

Figure 12:
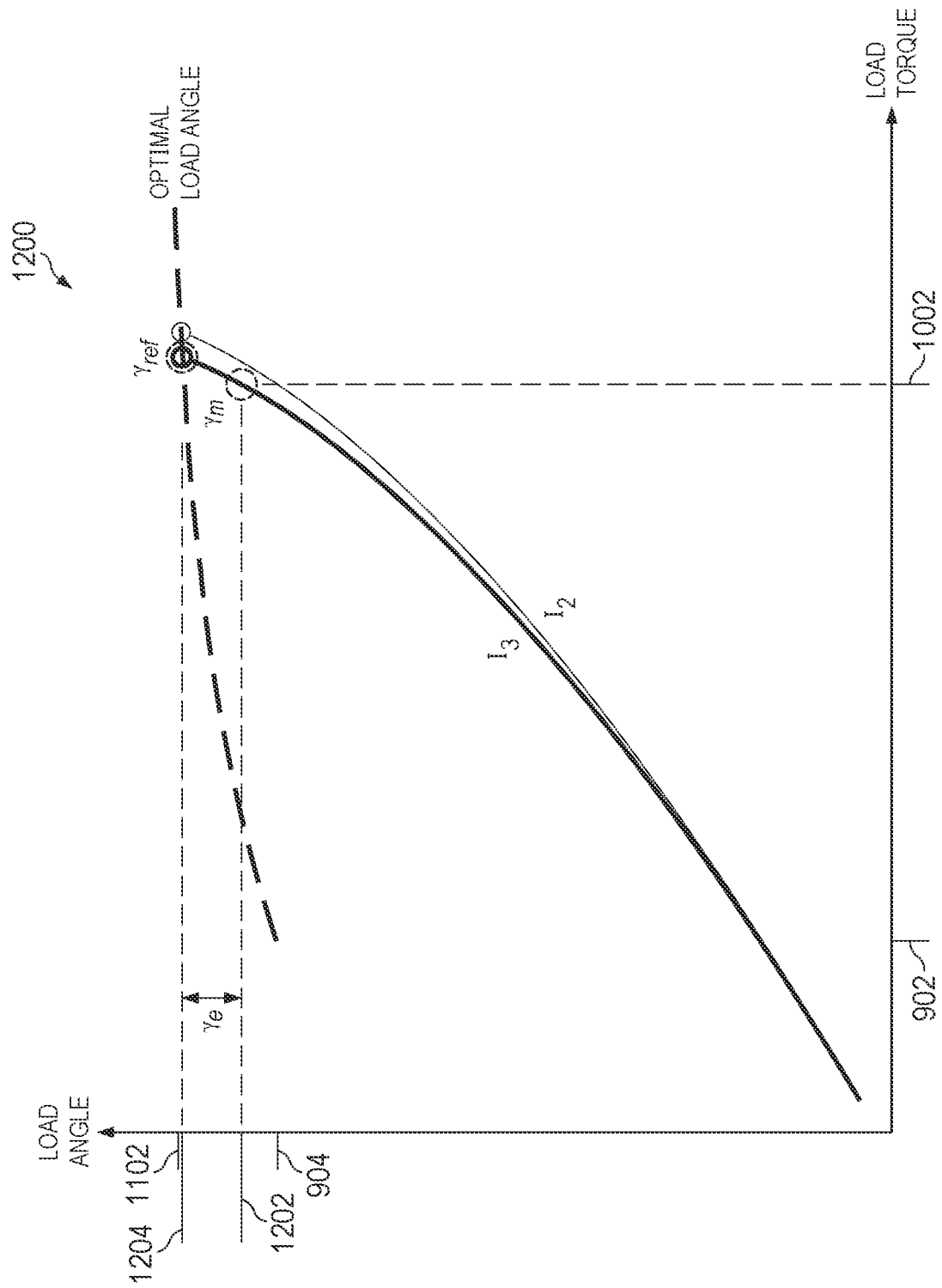

At FIG. 12, in response to the change (e.g., decrease) in the load angle error $\gamma_e$, the reference current level $I_{ref}$ is decreased. For example, the reference current level $I_{ref}$ is decreased (e.g., by controller circuitry 502) from the second current level $I_2$ to a third current level $I_3$. Reducing the reference current level $I_{ref}$ (and thus the motor current) causes the motor load angle $\gamma_m$ to increase from the first angle 904 to a third angle 1202, thereby decreasing the magnitude of the load angle error $\gamma_e$.

Additionally, at FIG. 12, the reference load angle $\gamma_{ref}$ is decreased according to the decreased reference current level $I_{ref}$. For example, the reference load angle $\gamma_{ref}$ is decreased (e.g., by the reference load angle control circuitry 114) from the second angle 1102 to a fourth angle 1204. The fourth angle 1204 is determined (e.g., by the reference load angle control circuitry 114) based on the third current level $I_3$. Reducing the reference load angle $\gamma_{ref}$ further decreases the magnitude of the load angle error $\gamma_e$.

Figure 13:
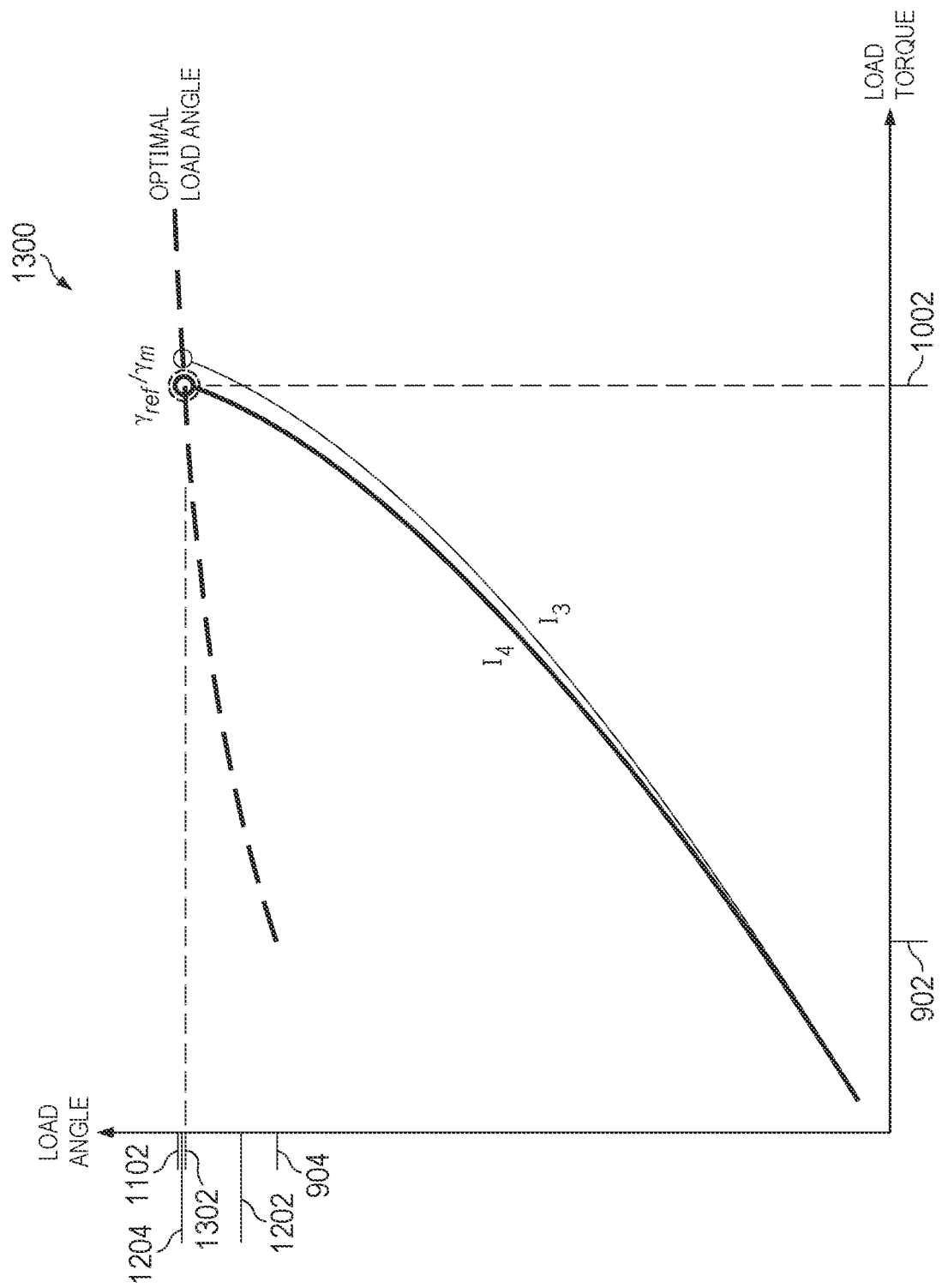

At FIG. 13, because the load angle error $\gamma_e$ has not yet reached the threshold, the reference current level $I_{ref}$ is again decreased. For example, the reference current level $I_{ref}$ is decreased from the third current level $I_3$ to a fourth current level $I_4$. Reducing the reference current level $I_{ref}$ (and thus the motor current $I_m$) causes the motor load angle $\gamma_m$ to increase from the third angle 1202 to a fifth angle 1302, thereby decreasing the magnitude of the load angle error $\gamma_e$.

Additionally, at FIG. 13, the reference load angle $\gamma_{ref}$ is decreased according to the decreased reference current level $I_{ref}$. Thus, the magnitude of the load angle error $\gamma_e$ is further reduced. For example, the reference load angle $\gamma_{ref}$ is decreased from the fourth angle 1204 to the fifth angle 1302. The fifth angle 1302 is determined based on the fourth current level $I_4$.

At this point, the load angle error $\gamma_e$ has reached the threshold. For example, the reference load angle $\gamma_{ref}$ and the motor load angle $\gamma_m$ are approximately equal and hence the load angle error $\gamma_e$ is approximately equal to zero. Because the load angle error $\gamma_e$ has reached the threshold, the reference current level $I_{ref}$ is not adjusted further. Consequently, the reference load angle $\gamma_{ref}$ is not further adjusted. Further, because reference load angle $\gamma_{ref}$ has been adjusted so that the reference current level $I_{ref}$ (and thus the motor current $I_m$) is minimized for the new load torque, the power efficiency of the motor may be improved.

Figure 14:
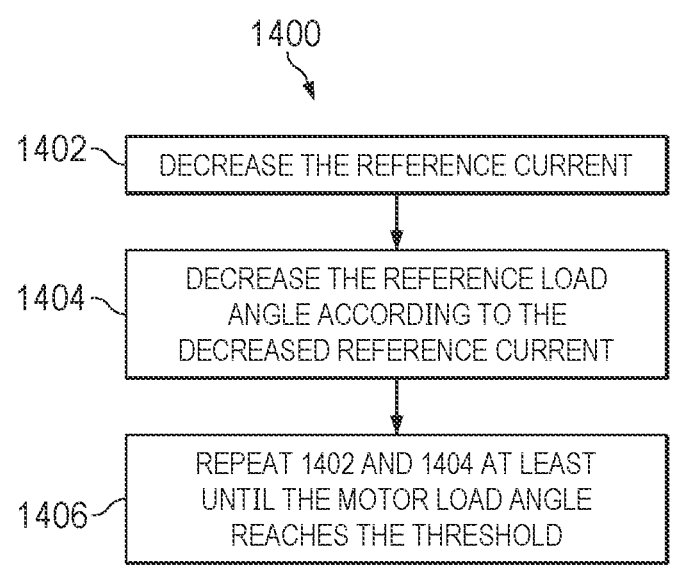
FIG. 14 is a flow diagram of some other examples of a method for controlling a motor.

FIG. 14 is a flow diagram of some examples of a method 1400 for controlling a motor in response to a decrease in a load torque of the motor. For example, in an automobile, a clogged fuel filter, clogged or leaking fuel injector, or even an air conditioning unit consuming a large amount of power on a hot day can cause the automobile's motor to lose torque. So cleaning or replacing the fuel filter or fuel injector, or simply operating the car on a cooler day when the air conditioner draws less power can restore the torque to a higher level. When the load torque deceases, the motor load angle $\gamma_m$ decreases but the reference load angle $\gamma_{ref}$ remains unchanged. Thus, the magnitude of the load angle error $\gamma_e$ increases (e.g., the load angle error $\gamma_e$ becomes negative).

At block 1402, the method includes decreasing the reference current level $I_{ref}$. In some examples, the motor controllers of FIGS. 1, 5, and 6 and the apparatus of FIG. 7 perform the function indicated at block 1402. For instance, in response to the decrease in the load angle error ye, controller circuitry 502 decreases the reference current level $I_{ref}$. The amount by which the reference current level $I_{ref}$ is decreased may be small so that the reference current level $I_{ref}$ is gradually decreased. Decreasing the reference current level $I_{ref}$ causes the motor current $I_m$ to decrease accordingly.

At block 1404, the method includes decreasing the reference load angle $\gamma_{ref}$ according to the decreased reference current level $I_{ref}$ (or the decreased motor current $I_m$). In some examples, the motor controllers of FIGS. 1, 5, and 6 and the apparatus of FIG. 7 perform the function indicated at block 1404. For instance, in response to the decrease in the reference current level $I_{ref}$ (or the motor current $I_m$), the reference load angle control circuitry 114 decreases the reference load angle $\gamma_{ref}$ based on the decreased reference current level $I_{ref}$ (or the decreased motor current $I_m$).

At block 1406, the method includes repeating the functions indicated at blocks 1402 and 1404 at least until the load angle error $\gamma_e$ reaches the threshold. For example, the functions indicated at blocks 1402 and 1404 are repeated at least until the magnitude of the load angle error $\gamma_e$ reaches the magnitude of the threshold. In some examples, the motor controllers of FIGS. 1, 5, and 6 and the apparatus of FIG. 7 perform the function indicated at block 812.

FIGS. 15-19 are graphs 1500-1900 illustrating example current levels and load angles of the motor controller and the motor over time according to the method of FIG. 14.

Figure 15:
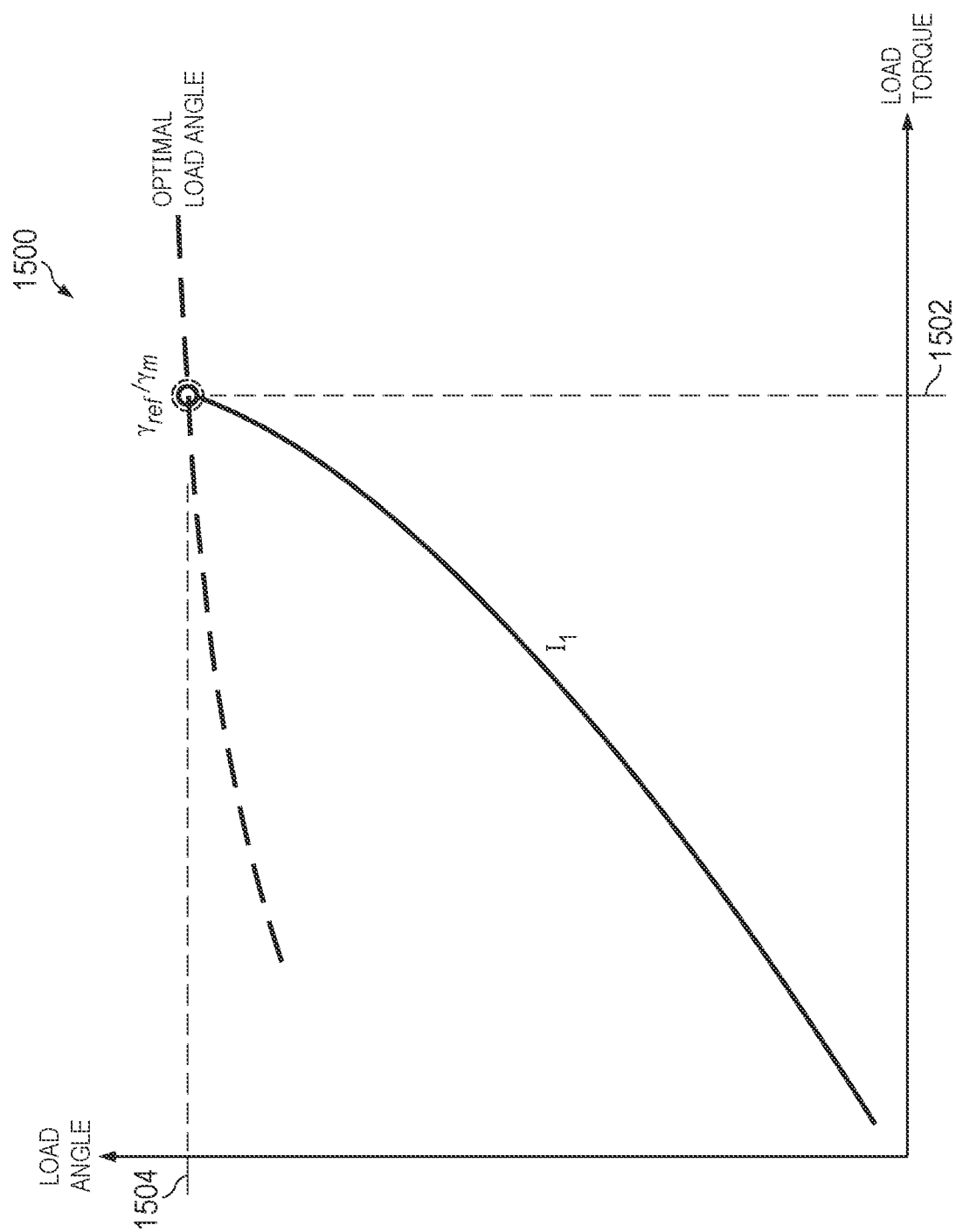
FIGS. 15-19 are graphs illustrating example current levels and load angles of the motor controller and the motor over time according to the method of FIG. 14.

At FIG. 15, the load torque is equal to a first torque 1502 and the reference current level is equal to a first current level $I_1$. The motor load angle $\gamma_m$ and the reference load angle $\gamma_{ref}$ are equal to a first angle 1504.

Figure 16:
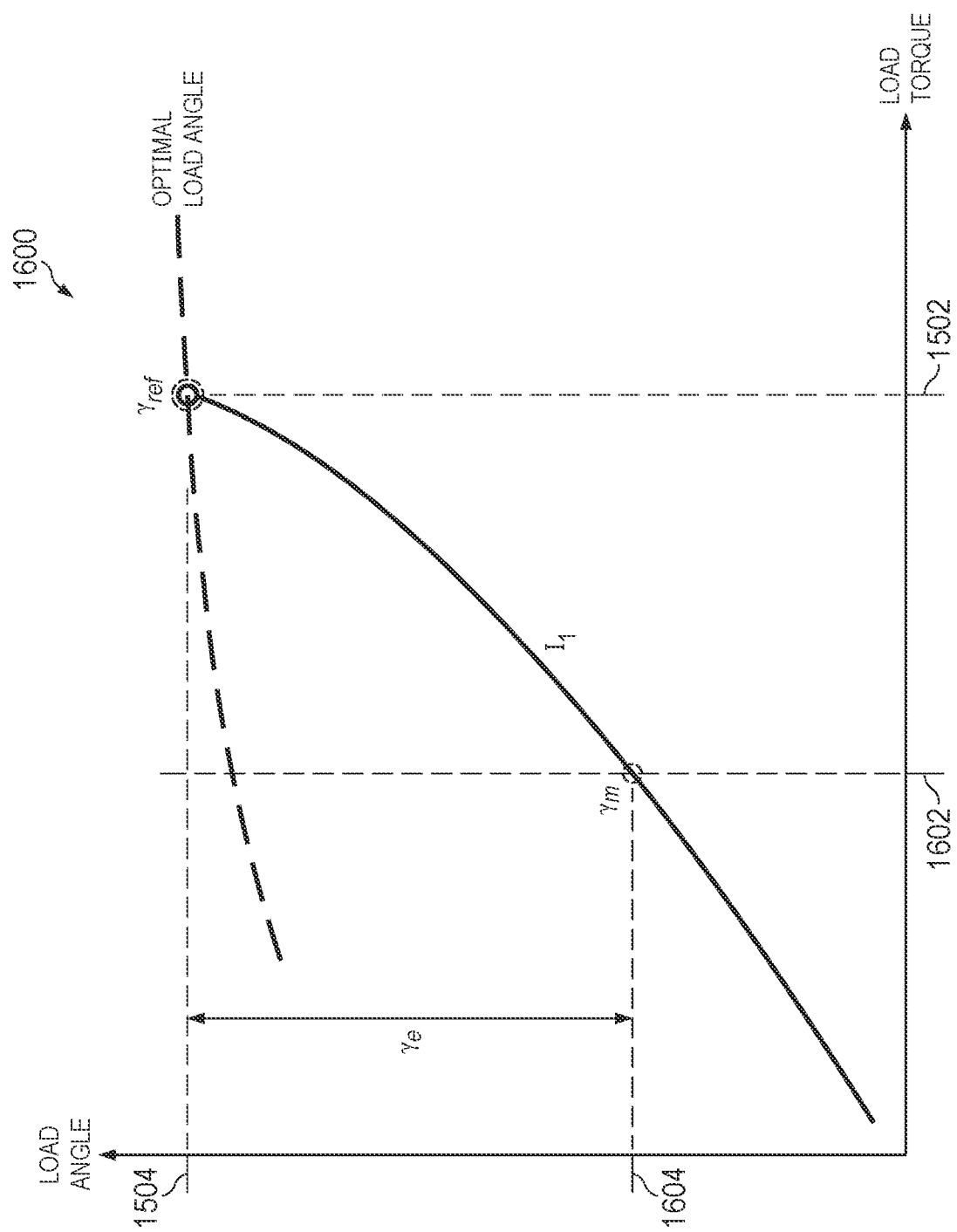

At FIG. 16, the load torque on the motor decreases from the first torque 1502 to a second torque 1602. As a result, the motor load angle $\gamma_m$ decreases from the first angle 1504 to a second angle 1604 while the reference load angle $\gamma_{ref}$ remains unchanged. Thus, the magnitude of the load angle error $\gamma_e$ increases (e.g., the load angle error $\gamma_e$ moves in the negative direction).

Figure 17:
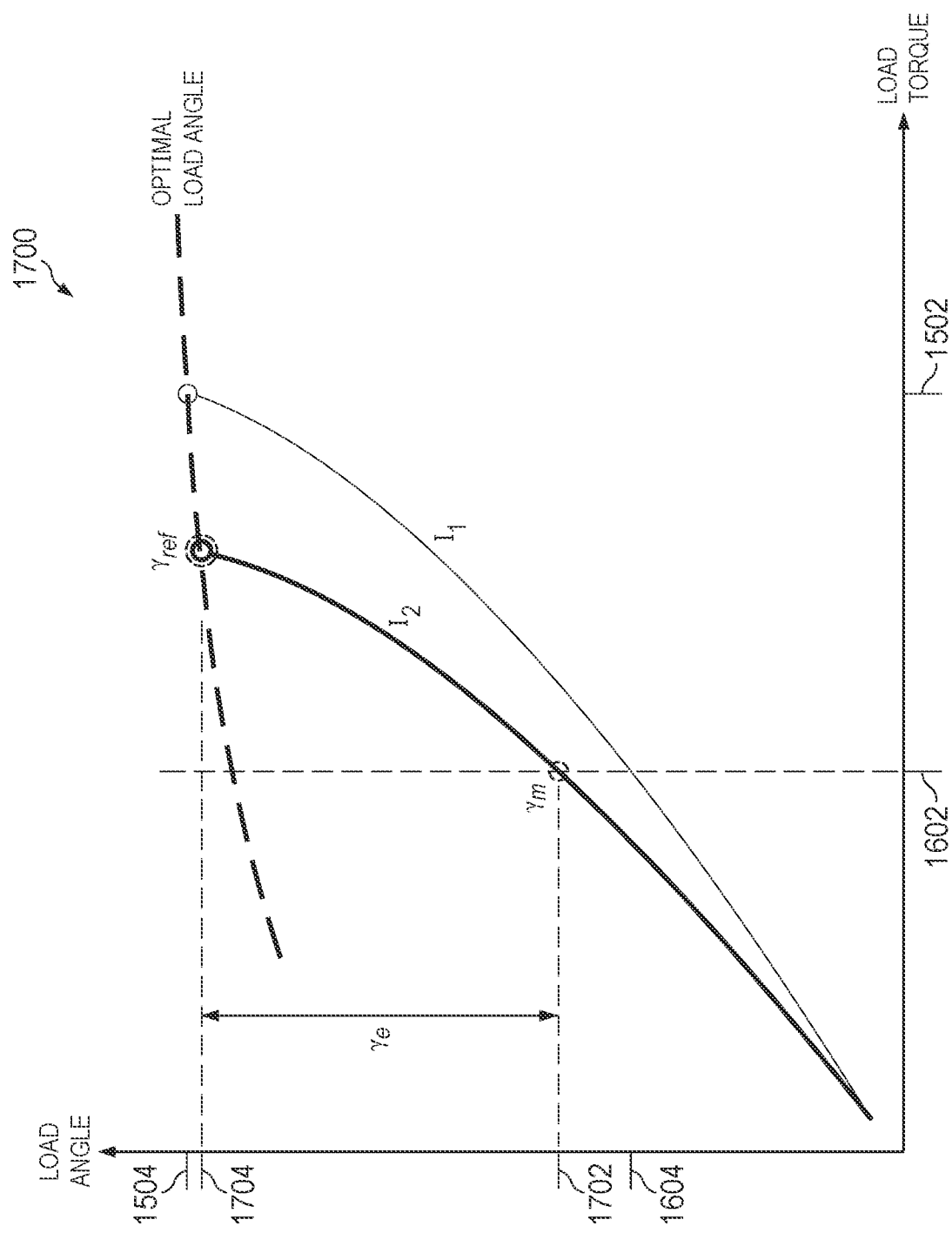

At FIG. 17, in response to the change (e.g., decrease) in the load angle error $\gamma_e$, the reference current level $I_{ref}$ is decreased. For example, the reference current level $I_{ref}$ is decreased (e.g., by controller circuitry 502) from the first current level $I_1$ to a second current level $I_2$. Reducing the reference current level $I_{ref}$ (and thus the motor current $I_m$) causes the motor load angle $\gamma_m$ to increase the second angle 1604 to a third angle 1702, thereby decreasing the magnitude of the load angle error $\gamma_e$.

Additionally, at FIG. 17, in response to the decrease in the reference current level $I_{ref}$, the reference load angle $\gamma_{ref}$ is decreased accordingly. For example, the reference load angle $\gamma_{ref}$ is decreased (e.g., by the reference load angle control circuitry 114) from the first angle 1504 to a fourth angle 1704 based on the second current level $I_2$. Reducing the reference load angle $\gamma_{ref}$ reduces magnitude of the load angle error $\gamma_e$.

Figure 18:
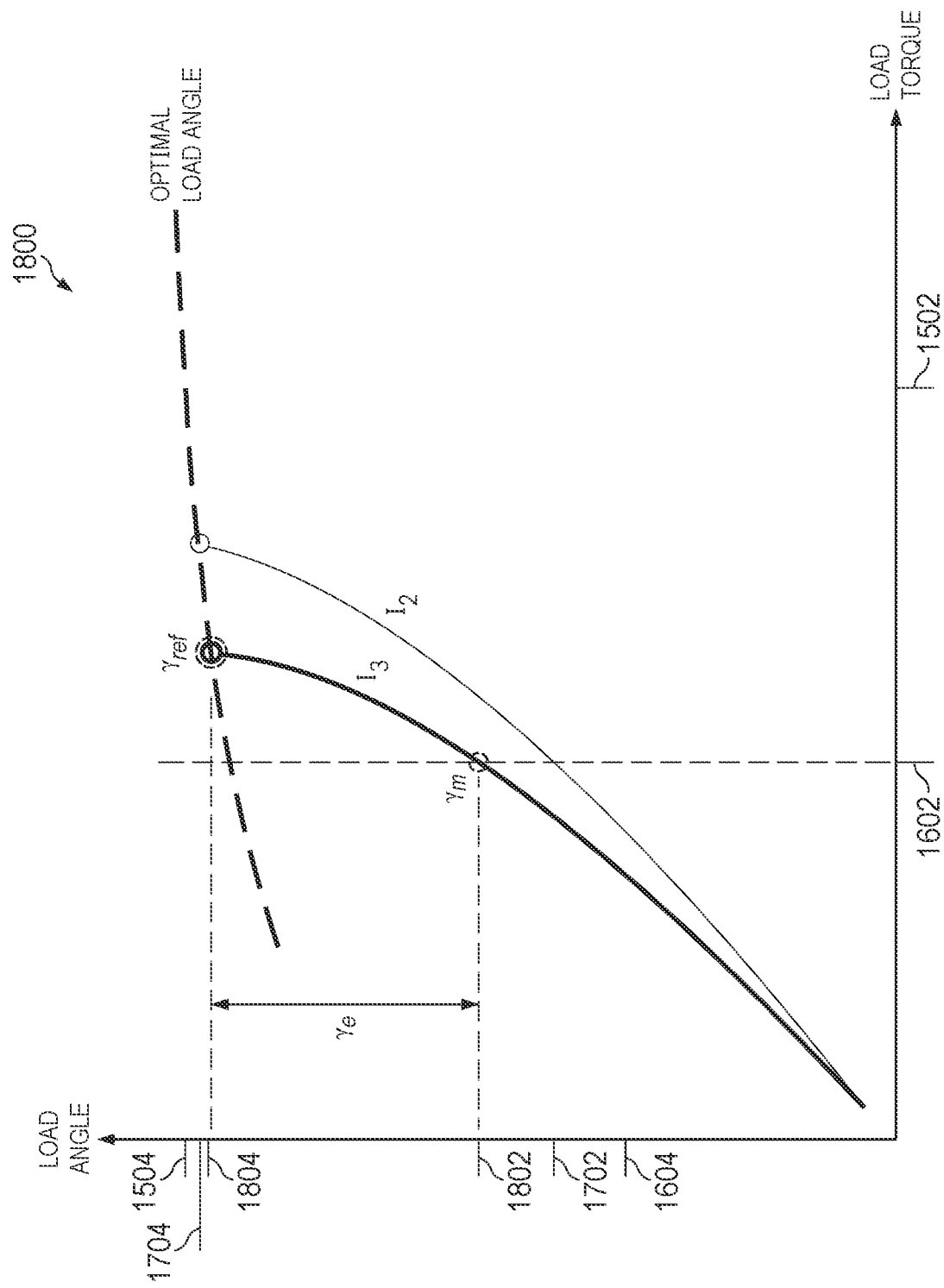

At FIG. 18, because the load angle error $\gamma_e$ has not yet reached the threshold, the reference current level $I_{ref}$ is again decreased. For example, the reference current level $I_{ref}$ is decreased from the second current level $I_2$ to a third current level $I_3$. Reducing the reference current level $I_{ref}$ (and thus the motor current $I_m$) causes the motor load angle $\gamma_m$ to increase from the third angle 1702 to a fifth angle 1802, thereby reducing the magnitude of the load angle error ye.

Additionally, at FIG. 18, in response to the decrease in the reference current level $I_{ref}$, the reference load angle $\gamma_{ref}$ is decreased accordingly. For example, the reference load angle $\gamma_{ref}$ is decreased from the fourth angle 1704 to a sixth angle 1804 based on the third current level $I_3$. Reducing the reference load angle $\gamma_{ref}$ reduces the magnitude of the load angle error $\gamma_e$.

Figure 19:
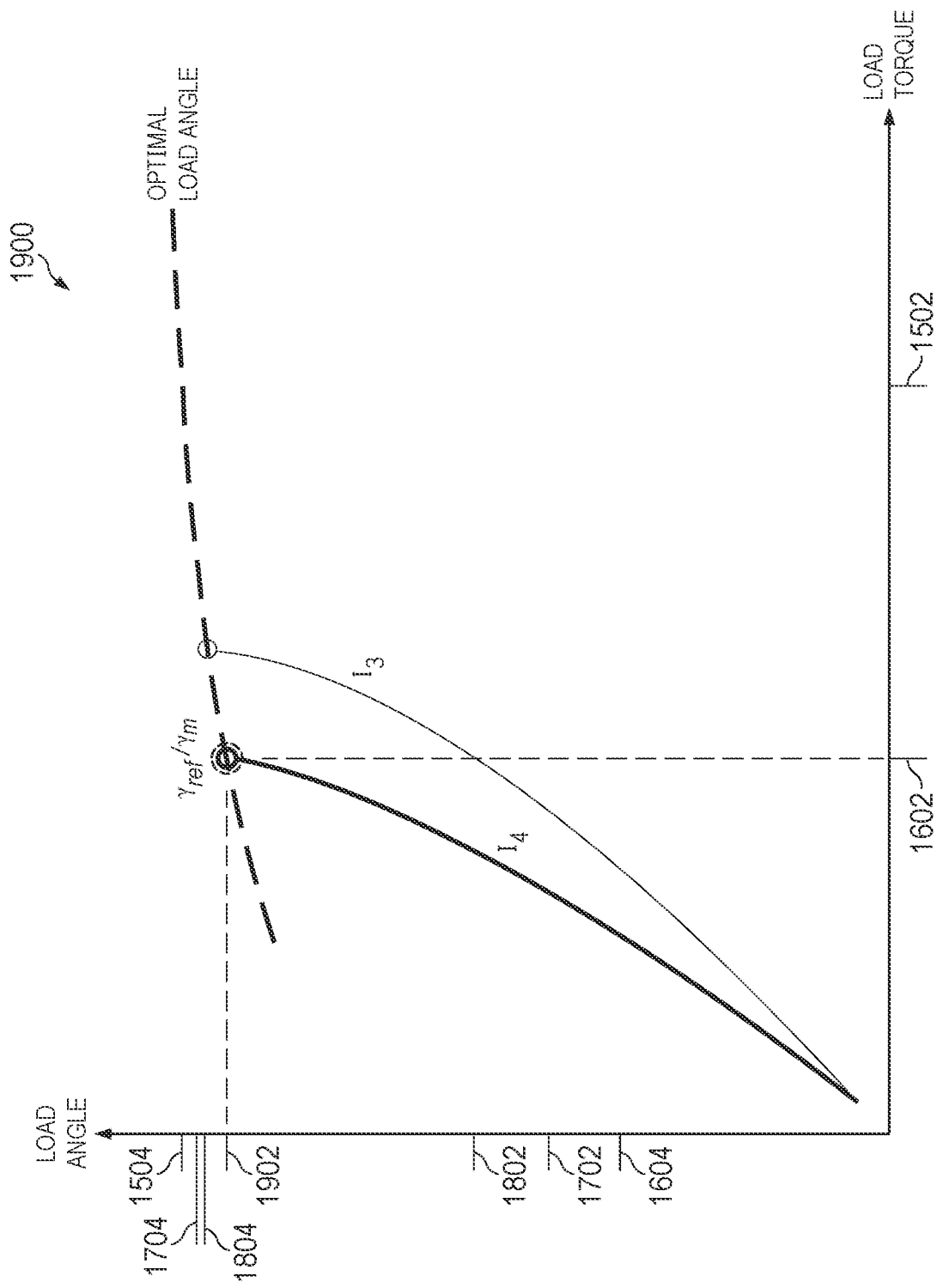

At FIG. 19, because the load angle error $\gamma_e$ has not yet reached the threshold, the reference current level $I_{ref}$ is again decreased. For example, the reference current level $I_{ref}$ is decreased from the third current level $I_3$ to a fourth current level $I_4$. Reducing the reference current level (and thus the motor current $I_m$) causes the motor load angle $\gamma_m$ to increase from the fifth angle 1802 to a seventh angle 1902, thereby reducing the magnitude of the load angle error $\gamma_e$.

Additionally, at FIG. 19, in response to the decrease in the reference current level $I_{ref}$, the reference load angle $\gamma_{ref}$ is decreased accordingly. For example, the reference load angle is decreased from the sixth angle 1804 to the seventh angle 1902 based on the fourth current level $I_4$. At this point, the load angle error $\gamma_e$ has reached the threshold. For example, the reference load angle $\gamma_{ref}$ and the motor load angle $\gamma_m$ are approximately equal and hence the load angle error $\gamma_e$ is approximately equal to zero. Because the load angle error $\gamma_e$ has reached the threshold, the reference current level $I_{ref}$ is not adjusted further. Consequently, the reference load angle $\gamma_{ref}$ is not adjusted further.

In various examples, method(s) discussed herein can be implemented as computer executable instructions. Thus, in various examples, a computer-readable storage device can store computer executable instructions that, when executed by a machine (e.g., computer, processor), cause the machine to perform methods or operations described or claimed herein including operation(s) described in connection with methods 800, 1400, or any other methods or operations described herein. While executable instructions associated with the listed methods are described as being stored on a computer-readable storage device, it is to be appreciated that executable instructions associated with other example methods or operations described or claimed herein can also be stored on a computer-readable storage device. In different examples, the example methods or operations described herein can be triggered in different ways. In one example, a method or operation can be triggered manually by a user. In another example, a method or operation can be triggered automatically.

"Computer-readable storage device", as used herein, refers to a device that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage device may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

The methods are illustrated and described above as a series of functions or events, but the illustrated ordering of such functions or events is not limiting. For example, some functions or events may occur in different orders and/or concurrently with other functions or events apart from those illustrated and/or described herein. Also, some illustrated functions or events are optional to implement one or more aspects or examples of this description. Further, one or more of the functions or events depicted herein may be performed in one or more separate functions and/or phases. In some examples, the methods described above may be implemented in a computer readable medium using instructions stored in a memory.

In this description, the term "couple" may cover connections, communications or signal paths that enable a functional relationship consistent with this description. Accordingly, if device A generates a signal to control device B to perform an action, then: (a) in a first example, device A is coupled directly to device B; or (b) in a second example, device A is coupled to device B through intervening component C if intervening component C does not substantially alter the functional relationship between device A and device B, so device B is controlled by device A via the control signal generated by device A.

Further, the term "configured to" describes the structure one or more components. For example, a processor can take a number of different structural forms but when loaded with appropriate instructions can be "configured to" carry out some function. Also, in many instances, functionality can be achieved by using various analog circuits or digital circuits which have a wide degree of different physical structures, and the overarching functionality may be described by circuitry, components, elements, etc., "configured to" achieve that functionality. In this regard, the function can manifest itself in many different structural implementations, and "configured to" broadly captures the various structural implementations as may be implemented in analog circuitry, digital circuitry, mixed signal circuitry, hardware, and/or software. Modifications are possible in the described examples, and other implementations are possible, within the scope of the claims.

What is claimed is:

1. A motor controller comprising:
  load angle error determination circuitry configured to determine a load angle error based on a difference between a motor load angle and a reference load angle, the motor load angle indicating an angle between a stator magnetic field and a rotor magnetic field;
  current control circuitry configured to set a reference current level based on the load angle error and to control a motor current based on the reference current level, the current control circuitry comprising:
    micro-stepping indexer circuitry configured to generate step current levels based on the reference current level and a step pulse signal; and
    current error determination circuitry configured to determine a current error based on the difference between the step current levels and a motor current level, the current control circuitry configured to generate a driver control signal based on the current error; and
  reference load angle control circuitry configured to set the reference load angle based on the reference current level.

2. The motor controller of claim 1, wherein the current control circuitry including:
  first controller circuitry configured to set the reference current level based on the load angle error; and
  second controller circuitry configured to generate the driver control signal based on the current error.

3. The motor controller of claim 1, wherein the current control circuitry is configured to set the reference current level by:
  increasing the reference current level based on the load angle error and a threshold; and
  setting the reference current level to an increased reference current level responsive to the load angle error reaching the threshold.

4. The motor controller of claim 3, wherein the reference load angle control circuitry is configured, after a delay, to set the reference load angle based on the increased reference current level.

5. The motor controller of claim 2, wherein the current control circuitry further includes:
  driver circuitry configured to generate the motor current based on the driver control signal.

6. The motor controller of claim 1, wherein the reference load angle control circuitry is configured to set the reference load angle according to an equation in which the reference current level is in an input and the reference load angle is an output.

7. The motor controller of claim 1, wherein the reference load angle control circuitry is configured to set the reference load angle according to a lookup table in which the reference current level is in an input and the reference load angle is an output.

8. The motor controller of claim 1, further comprising:
  an input for receiving the motor load angle from a motor sensor, wherein the load angle error determination circuitry is configured to receive the motor load angle from the input.

9. The motor controller of claim 1, further comprising:
  motor load angle determination circuitry configured to estimate the motor load angle, wherein the load angle error determination circuitry is configured to receive the motor load angle from the motor load angle determination circuitry.

10. The motor controller of claim 1, wherein:
  the current control circuitry is configured to set the reference current level by decreasing the reference current level; and
  the reference load angle control circuitry is configured to set the reference load angle by decreasing the reference load angle based on the decreasing reference current level, wherein the current control circuitry is configured to decrease the reference current level, and the reference load angle control circuitry is configured responsive to decrease the reference load angle based on the decreasing reference current level until the load angle error reaches a threshold.

11. The motor controller of claim 1, wherein:
  the current control circuitry is configured to set the reference current level by decreasing the reference current level;
  the reference load angle control circuitry is configured to set the reference load angle by decreasing the reference load angle based on the decreasing reference current level; and
  the current control circuitry is configured to decrease the reference current level, and the reference load angle control circuitry is configured responsive to decrease the reference load angle based on the decreasing reference current level until the motor load angle reaches a threshold.

12. An apparatus comprising:
  a motor controller including:
    load angle error determination circuitry configured to determine a load angle error based on a difference between a motor load angle and a reference load angle, the motor load angle indicating an angle between a stator magnetic field and a rotor magnetic field;
    current control circuitry configured to set a reference current level based on the load angle error and to control a motor current based on the reference current level, wherein the current control circuitry is configured to set the reference current level by decreasing the reference current level; and reference load angle control circuitry configured to set the reference load angle based on the reference current level, wherein the reference load angle control circuitry is configured to set the reference load angle by decreasing the reference load angle based on the decreasing reference current level, wherein the reference load angle control circuitry is configured to set the reference load angle according to at least one of:
- an equation in which a motor current level is in an input and the reference load angle is an output; or
- a lookup table in which the motor current level is in the input and the reference load angle is the output.

13. The apparatus of claim 12, wherein the current control circuitry is configured to decrease the reference current level, and the reference load angle control circuitry is configured responsive to decrease the reference load angle based on the decreasing reference current level until the load angle error reaches a threshold.

14. The apparatus of claim 12, wherein the current control circuitry is configured to decrease the reference current level, and the reference load angle control circuitry is configured responsive to decrease the reference load angle based on the decreasing reference current level until the motor load angle reaches a threshold.

15. The apparatus of claim 12, wherein the current control circuitry is further configured to determine a current error based on a step pulse signal and a difference between the reference current level and a motor current level indicating the motor current, and generate a driver control signal based on the current error, and the apparatus further comprising:
   driver circuitry configured to generate the motor current based on the driver control signal.

16. The apparatus of claim 12, further comprising a motor sensor coupled to the current control circuitry, wherein motor sensor is configured to provide the motor load angle.

17. The apparatus of claim 12, wherein the current control circuitry further comprises motor load angle determination circuitry configured to estimate the motor load angle.

18. An apparatus comprising:
load angle error determination circuitry configured to determine a load angle error based on a difference between a motor load angle and a reference load angle, the motor load angle indicating an angle between a stator magnetic field and a rotor magnetic field of a motor;
current control circuitry configured to:
   set a reference current level based on the load angle error;
   generate step current levels based on the reference current level and a step pulse signal;
   determine a current error based on a difference between the step current levels and a motor current level; and
   generate a driver control signal, based on the current error, to control the motor current level; and
reference load angle control circuitry configured to set the reference load angle based on the motor current level, wherein the reference load angle control circuitry is configured to set the reference load angle according to at least one of:
an equation in which the motor current level is in an input and the reference load angle is an output; or
a lookup table in which the motor current level is in the input and the reference load angle is the output.

\* \* \* \* \*